(12) United States Patent
Gibbons et al.

(10) Patent No.: US 7,275,243 B2
(45) Date of Patent: Sep. 25, 2007

(54) MOBILE DOWNLOAD SYSTEM

(75) Inventors: Bill Gibbons, Los Altos Hills, CA (US); Manish Dixit, Sunnyvale, CA (US); Carlos Jose Herrera, San Jose, CA (US); Dale D. Jin, Newark, CA (US); Alexander Quincey Musil, Mountain View, CA (US); Manish Ramesh Shah, Fremont, CA (US); Roger Robert Webster, San Martin, CA (US); Denise Dandong Xu, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 732 days.

(21) Appl. No.: 10/393,561

(22) Filed: Mar. 21, 2003

(65) Prior Publication Data
US 2004/0034853 A1 Feb. 19, 2004

Related U.S. Application Data

(60) Provisional application No. 60/367,086, filed on Mar. 22, 2002.

(51) Int. Cl.
G06F 9/45 (2006.01)
G06F 9/445 (2006.01)
(52) U.S. Cl. .................... 717/159; 717/178
(58) Field of Classification Search ............... 717/159, 717/178
See application file for complete search history.

(56) References Cited

U.S. PATENT DOCUMENTS

| 5,664,207 | A | 9/1997 | Crumpler et al. | ........... 395/766 |
|---|---|---|---|---|
| 5,819,274 | A | 10/1998 | Jackson, Jr. | ................. 707/10 |
| 6,295,645 | B1 | 9/2001 | Brewer | ........................ 717/11 |
| 6,341,316 | B1 | 1/2002 | Kloba et al. | ................ 709/248 |
| 6,578,192 | B1* | 6/2003 | Boehme et al. | ............. 717/115 |
| 7,065,752 | B2* | 6/2006 | Willard | ...................... 717/140 |
| 2002/0019225 | A1 | 2/2002 | Miyashita | |
| 2002/0032756 | A1 | 3/2002 | Toda | |
| 2002/0143629 | A1 | 10/2002 | Mineyama et al. | |
| 2003/0050837 | A1 | 3/2003 | Kim | |
| 2006/0095510 | A1* | 5/2006 | Rouse et al. | ................ 709/203 |

* cited by examiner

Primary Examiner—Tuan Dam
Assistant Examiner—John J Romano
(74) Attorney, Agent, or Firm—Martine Penilla & Gencarella, LLP

(57) ABSTRACT

Methods and systems are provided for adapting software applications for download and execution on a variety of different mobile devices which employ different Application Execution Environments. An Application Download Protocol for transferring applications to mobile devices is also provided. Mobile devices can be matched with compatible applications according to functionality required by the applications and functionality provided by the mobile devices. Applications submitted by developers can be automatically matched to application categories, thus facilitating user selection of applications. Data used by applications running on mobile devices can be remotely managed by application developers, allowing developers to remotely control the type and presentation of data on mobile devices without the need for data management servlets to be provided by the developers.

14 Claims, 15 Drawing Sheets

```xml
<?xml version="1.0" encoding="utf-8"?>

<!-- Content/Application Descriptor -->
<!-- Comments for each Tag are given below the Tag -->

<content-descriptor>
        <midlet>
                <resource-id>Stockticker_1</resource-id>
        <!-- Necessary Tag, Unique for each instance, Case insensitive, No space -->
        <!--previous-res-id>Stockticker_1</previous-res-id -->
        <!-- Necessary Tag, If submitting a new instance, Case insensitive, No space -->
        <content-url src="http://www.midletcentral.com/store/jar/Stockticker.jar?id=123"/>
        <!-- Optional Tag, This tag can be used to submit the content URL, instead of actual content, Case insensitive, No space -->
        <version>V1.0</version>
                <!-- Optional Tag -->
                <device-icon src="/icon/device_icon.gif"/>
        <!-- Optional Tag -->
        <target>
                        <!-- Necessary Tag -->
                        <carrier>
                                <value>pixo</value>
                                <!-- Carrier Name is Case sensitive, No space -->
                        </carrier>
                        <locale>
                                <value>en_US</value>
                                <!-- Locale value is Case sensitive, No space -->
                        </locale>
                        <device>
                                <capability id="bitsperpixel" min="8" max="16"/>
                                <!-- id is Case sensitive, No space -->
                                <capability id="colorcapable" value="Yes"/>
                                <!-- id is Case sensitive, No space -->
                                <capability id="imagecapable" value="Yes"/>
                                <!-- id is Case sensitive, No space -->
                                <capability id="inputcharSet">
                                        <!-- id is Case sensitive, No space -->
                                        <value>US-ASCII</value>
                                        <value>utf-8</value>
                                </capability>
                                <capability id="outputcharSet">
                                        <!-- id is Case sensitive, No space -->
                                        <value>US-ASCII</value>
                                </capability>
                                <capability id="screenheight" min="64" max="128"/>
                                <!-- id is Case sensitive, No space -->
                                <capability id="screenwidth" min="64" max="128"/>
                                <!-- id is Case sensitive, No space -->
                                <capability id="softkeyscapable" value="Yes"/>
                                <!-- id is Case sensitive, No space -->
                        </device>
                </target>
        </midlet>
</content-descriptor>
```

Figure 7

```xml
<?xml version="1.0" encoding="utf-8"?>
<!-- Content Registration, Web Descriptor -->

<web-descriptor>
    <!--upgrade id="Stockticker_1"/--><!-- Not needed, If submitted for the first time, But Necessary to Upgrade the info -->
    <category>Home:Business:Finance</category>
    <!-- TBD (Necessary Tag ??, Developer can specify keyword also??) -->
    <web-group>
            <locale>en_US</locale>
        <!-- Necessary Tag -->
                <display-name>StockTicker</display-name>
                <!-- Necessary Tag -->
                <short-desc>Get the latest Stock quotes</short-desc>
        <!-- Necessary Tag -->
        <long-desc>Get the latest Stock quotes</long-desc>
        <!-- Optional Tag -->
                <small-icon src="/icon/smallicon.gif"/>
                <!-- Optional Tag -->
                <large-icon src="/icon/largeicon.gif"/>
                <!-- Optional Tag -->
        </web-group>
    <web-group>
            <locale>fr_FR</locale>
        <!-- Necessary Tag-->
        <display-name>Tschüß</display-name>
                <!-- Necessary Tag -->
                <short-desc>üß schüßet Tschüß schüß grüßg</short-desc>
        <!-- Necessary Tag -->
        <long-desc>üß schüßet Tschüß schüß grüßg</long-desc>
        <!-- Optional Tag -->
                <small-icon src="/icon/smallicon.gif"/>
                <!-- Optional Tag -->
                <large-icon src="/icon/largeicon.gif"/>
                <!-- Optional Tag -->
        </web-group>
</web-descriptor>
```

Figure 11

```xml
<?xml version='1.0' encoding='utf-8'?>
<!-- Phonelet Configuration Descriptor -->

<phonelet-config>
  <config-item-list>

<!-- name: case insensitive -->
    <config-item name="Broker">
      <default-value>MS</default-value>
    </config-item>

<config-item name="Speed">
        <!-- Guard defines validation for an item.
            It may contains one or more range or option
            list
        -->
        <guard>
           <range min="14" max="20"/> <!-- define inclusive range -->
        </guard>

<!-- gui controls how a item will be rendered. It can have
            an optional type attribute. The possible type are
            "text", "list", "dropdown". Default is "text"
        -->
        <gui>
           <display-name>Speed</display-name>  <!-- optional -->
        </gui>
        <default-value>15</default-value>
    </config-item>

<config-item name="Agent" type="list">
        <guard>
           <option-list>
              <list-item>AAAA</list-item>
              <list-item>BBBB</list-item>
              <list-item>CCCC</list-item>
              <list-item>DDDD</list-item>
           </option-list>
        </guard>

<gui type="dropdown">
           <display-name>Agents</display-name> <!-- optional -->
        </gui>

<default-value>
           <list-item>AAAA</list-item>
        </default-value>

</config-item>

<config-item name="symbols" type="list">
        <guard>
           <option-list>
              <list-item>yahoo</list-item>
              <list-item>cisco</list-item>
              <list-item>pixo</list-item>
```

Figure 12A

```xml
        <list-item>ebay</list-item>
        <list-item>intel</list-item>
    </option-list>
</guard>

<gui type="list">
    <display-name>Stock Symbols</display-name>   <!-- optional -->
    <display-attrs lines="3" multiple="yes"/>   <!-- optional -->
</gui>

<default-value>
    <list-item>yahoo</list-item>
    <list-item>pixo</list-item>
    <list-item>ebay</list-item>
</default-value>

</config-item>

</config-item-list>
</phonelet-config>
```

Figure 12B

MOBILE DOWNLOAD SYSTEM

CLAIM TO PRIORITY

The present application claims the benefit of priority under 35 U.S.C. §119(e) to U.S. Provisional Patent Application entitled "Mobile Download System" Ser. No. 60/367,086, filed on Mar. 22, 2002, which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention is directed to technology for managing and processing applications for mobile devices.

BACKGROUND OF THE INVENTION

| Glossary of Abbreviations | |
|---|---|
| ADP | Application Download Protocol |
| ADS | Application Download Server |
| AEE | Application Execution Environment |
| AM | Application Manager |
| BREW | Binary Runtime Environment for Wireless |
| CPI | Capabilities and Preference Information |
| CSS | Cascading Style Sheets |
| DA | Download Application |
| DO | Download Object |
| DOM | Document Object Model |
| GUI | Graphical User Interface |
| HTML | Hyper-Text Markup Language |
| J2ME | Java 2, Micro Edition |
| MT | Mobile Terminal |
| PDA | Personal Digital Assistant |
| SMS | Short Message Service |
| URI | Uniform Resource Indicator |
| URL | Uniform Resource Locator |
| WAD | Wireless Application Descriptor |
| WAP | Wireless Access Protocol |
| WSAEE | Web Standards-Based Application Execution Environment |
| XHTML | Extensible Hyper-Text Markup Language |
| XML | Extensible Markup Language |

DESCRIPTION OF THE RELATED ART

A variety of devices have emerged for accessing data over sophisticated mobile data networks. These devices, referred to as mobile terminals (MTs) or mobile devices, include smart or web-enabled phones, personal digital assistants (PDAs), pagers, remote sensors, remote processing devices, and others known in the art. As these devices become more widespread, demand has increased for a wide variety of applications for MTs.

To address the demand for MT applications, several different Application Execution Environments (AEEs) have been deployed on MTs. AEEs enable MT users to download and execute applications on their MT device. AEEs provide an operating environment for executing applications on an MT device. This operating environment may include facilities for managing hardware resources, user input, network communication, and graphic displays. Additionally, the AEE may include facilities for downloading and installing applications on the MT device.

The application download facilities often work in conjunction with an Application Download Server (ADS) provided by the network operator. The ADS manages the mobile network infrastructure for providing MT applications. Functions of the ADS may include MT application storage, MT application configuration, billing for MT application use, and distribution of applications to MT devices. Examples of different AEEs include J2ME, BREW, and WAP.

Network operators face additional difficulties due the incompatibilities between different AEEs. Most AEEs implement their own protocol for downloading, updating, billing, and managing downloaded applications. Each of these protocols is closely tied to its AEEs, making the protocols inoperable on other AEEs. In order to support these different protocols, network operators must implement separate ADS systems for each AEE protocol. In addition to increasing the costs for a network operator, this incompatibility slows application deployment, discourages adoption of new MT devices, and ultimately limits the availability and variety of MT applications.

Network operators may generate additional revenue from the sale or rental of MT applications. One problem associated with this task is the inflexibility in the deployment of application business models. Conventionally, unlimited application use is provided in exchange for a relatively large flat fee. Although this model is useful for frequently used applications, the amount of this fee discourages purchases by occasional or casual application user. Other business models may charge a fixed amount for a single use, or by the application time used.

Typically, different business models must be implemented by the application developer. Changes to the business model usually require the production of a new version of the application. Thus, an application developer must produce many versions of the same application in order to satisfy the business model requirements of different network operators. Moreover, network operators are locked into the business model implemented by their applications. Any change in the network operator's business model requires the deployment of new versions of their entire application library. This inflexibility in deploying business models prevents network operators from maximizing MT application revenue.

Another obstacle to producing a wide variety of MT applications is the wide range of different AEE installed on MT devices. Applications written for one AEE environment are often incompatible with other AEE environments. The differences between many AEE are so great that converting between AEE is a difficult task. In order to make applications available to a large number of users, developers have to produce several different version of the same application. This diverts resources that could be spent developing different applications.

Moreover, even when a single AEE is installed on a large number of MT devices, there are typically many variations between models of similar devices running the same AEE. Examples of common variations include memory, user input hardware, and display size and capabilities. The variation between models running the same AEE requires a developer to tailor the same application for many different models of MT devices.

The lack of experienced application developers also impedes the development of a variety of applications. Other AEEs, such as J2ME and BREW, are relatively new to the market. It will be some time before there will be a large number of developers trained to write applications for these AEEs.

Different mobile devices may provide different functionality (or "capabilities"). A wide variety of applications (or "phonelets") can be downloaded, and run on mobile devices. However, as previously described, applications written for a particular mobile device may not be compatible with other devices. Different applications can require different types of functionality to be provided by the mobile devices on which they run. For example, some applications may require a color display, while others require only a monochrome display. Certain applications may require a minimum screen size much larger than that required of other applications. Other required functionality may include: a minimum memory capacity, sound reproduction, interfacing capabilities, and others as understood by those skilled in the art. If a given mobile device cannot provide the functionality required by an application, substandard performance may result. For example, an application requiring a certain minimum memory size may crash frequently, or simply not run at all on a mobile device with a memory capacity less than that required by the application.

One approach to this compatibility problem is for users of mobile devices to manually inspect applications before they are downloaded to determine whether the functionality required by the application is supported in the user's device. Nevertheless, the functionality required by an application may not be properly documented in a manner that is easily ascertainable by a user before the application is downloaded. Alternatively, a user can ascertain the functionality required by an application after it is downloaded. For example, the user could review a description included with the application before the application is run. Unfortunately, such an approach may require the user to invest considerable time downloading the application before the required functionality is even known by the user. This can result in significant download costs to the user for applications which may not run properly on the user's mobile device. Moreover, manual inspection can become impractical when large numbers of applications are available for downloading.

In order to efficiently distribute downloadable content to users, it is important for content providers to categorize applications such that users can quickly find applications they seek. Many types of applications are possible such as calendars, spreadsheets, games, and others known in the art. While some applications may be readily identifiable as belonging to a certain category (i.e. games), other applications may not be easily identified. Application developers may not provide satisfactory descriptions of applications before they are submitted to content providers. Indeed, even if a description is provided by a developer, it is likely to be in an ad hoc format which may differ from the formats of descriptions submitted by other developers.

Thus, administrators are often forced to review the descriptions of applications submitted by developers, and manually assign the applications to particular categories. This manual approach is impractical when large numbers of applications are submitted. In addition, the manual assignment of applications by individual administrators may be inconsistent. Different administrators may make different judgments regarding the appropriate category for a given application.

Mobile devices often have very limited memory capacities. Because of this, users often purge data and applications from mobile devices in order to load other applications or data in an effort to preserve precious memory. As a result, users may rely on remote servers to manage data used by mobile applications ("application data") and/or synchronize the data between multiple devices. Nevertheless, such data management and synchronization schemes usually rely on intermediate software. For example, an application developer may provide a servlet that manages application data for the developer's application which runs remotely on a user's mobile device. Such an approach is burdensome on both developers as well as content providers. Developers are forced to write servlets which are separate from their main application. The developer's expertise may be in the creation of downloadable applications, rather than data management servlets. Developers must also find a server to host the servlet. The cost involved in such a endeavor can be prohibitively expensive for prospective developers.

Content providers that provide downloadable content to mobile device users are also disadvantaged. It is undesirable for a content provider to be forced to run a third party developer's code, such as an application data management servlet. The content provider may not know whether a servlet written by a third-party developer contains malicious code that may interfere with the content provider's server. These uncertainties, as well as costs necessary to alleviate them, may be prove to be prohibitively expensive thus preventing beneficial relationships and/or business transactions between developers and content providers.

In view of the preceding discussion, it is desirable to have a single protocol which can be utilized by different AEEs. To encourage widespread adoption, the protocol should also employ standard mechanisms for communicating information over a network. Further, the protocol should enable network operators to implement new business models for generating revenue from application use by users.

Further, it is desirable to have an AEE environment capable of being deployed on a wide range of MT devices. This AEE should also be able to tailor applications to the variations between different devices with minimal developer intervention. Additionally, it is desirable to have an AEE leveraging preexisting, industry standard specifications, so as to enables the AEE to draw from a large pool of potential developers and to reduce the learning curve for developers.

It would further be desirable to provide a method of matching downloadable applications with devices that are capable of implementing all functionality required by the applications.

It would also be desirable to provide a method for automatically categorizing submitted applications.

It would further be desirable to provide a method whereby developers can remotely manage application data without running custom data management servlets on the remote servers.

SUMMARY OF THE INVENTION

According to the invention, generally, an Application Download Protocol for transferring Download Objects onto a Mobile Terminal Device includes a Wireless Application Descriptor associated with a Download Object. The Mobile Terminal Device accesses the Wireless Application Descriptor prior to retrieving the Download Object. The Wireless Application Descriptor specifies metadata elements associated with the Download Object including Package elements, Object elements, Restriction elements, Device elements, and Icon elements. Restriction elements specify usage restrictions on a Download Object. This enables rapid implementation of different business models. An Application Manager on the Mobile Terminal Device enforces the usage restrictions by terminating use of a Download Object when the usage restrictions have been exceeded.

According to the invention, generally, a Web Based Application Execution Environment operates applications built using industry-standard technologies commonly used for web page development. Developers build applications using Extensible Markup Language (XML), Extensible Hypertext Markup Language (XHTML), ECMAScript, Cascading Style Sheets (CSS), and Document Object Model (DOM). Using preexisting, industry standard technology allows web developers to leverage their skills to develop Mobile Terminal applications quickly and easily. The Web Based Application Execution Environment includes an ECMAScript Executor for executing ECMAScript Application logic in compiled bytecode form and a XHTML/XML parser for building a DOM tree for dynamic manipulation of the XHTML interface.

According to the invention, generally, a server-side packager prepares applications for download and execution on a Mobile Terminal Device. To adapt applications to the variations between different Mobile Terminal Devices, Cascading Style Sheets are used to describe application parameters for a Mobile Terminal Device. The Cascading Style Sheets are combined with an XHTML file specifying the application user interface. Embedded ECMAScript is removed from the XHTML file for compilation. The processed XHTML and bytecode compiled ECMAScript is combined into a compressed application file.

In accordance with the present invention, applications can be matched to mobile devices according to functionality required by applications and functionality provided by devices. In one embodiment, a content descriptor file is maintained for a downloadable application and submitted with the application to a content provider. The content descriptor file specifies functionality required by the application and enables the application to be matched with mobile devices that provide the required functionality.

The present invention further provides a method for automatically matching applications with categories. In one embodiment, a web descriptor file is included with an application when it is submitted to a content provider. Keywords in the web descriptor file allow the application to be matched with suitable application categories.

The present invention further provides a method for remotely managing application data for applications running on mobile devices. Application developers, who may not have direct access to a content provider's server, can remotely control user interface behavior of applications. Application data can be managed without the need for data management servlets to be provided by application developers.

BRIEF DESCRIPTION OF THE DRAWINGS

The present invention will now be described with reference to the drawings, in which:

FIG. 7 illustrates a sample content descriptor file;

FIG. 11 illustrates a sample web descriptor file;

FIGS. 12A and 12B illustrate a sample configuration descriptor file;

The invention will be better understood with reference to the drawings and detailed description below. In the drawings, like reference numerals indicate like components.

DETAILED DESCRIPTION

Application Download Protocol

The invention addresses the shortcomings associated with other AEE protocols by providing an open Application Download Protocol (ADP). The ADP can be implemented by a variety of AEEs. In order to encourage widespread adoption, the protocol is based on standard mechanisms for communicating information over a network. In an embodiment, the ADP uses extensible markup language (XML) for communicating information between AEE and the mobile network. XML is a universal format for structured documents and data on the Web. The use of XML allows the ADP to be easily implemented on a variety of AEEs.

The ADP further enables network operators to rapidly implement new business models for generating revenue from application use by users. Applications do not need to be individually tailored to different business models. Instead, at the time of application deployment, the ADP provides business model parameters to the AEE on MT device. The AEE uses the business model parameters to control the behavior of the associated application. The AEE executes an application in the manner specified by the business model parameters. When the network operator changes the business model parameters, the operation of the application is altered by the AEE. This enables the network operator to rapidly implement new business models.

Figure 1:
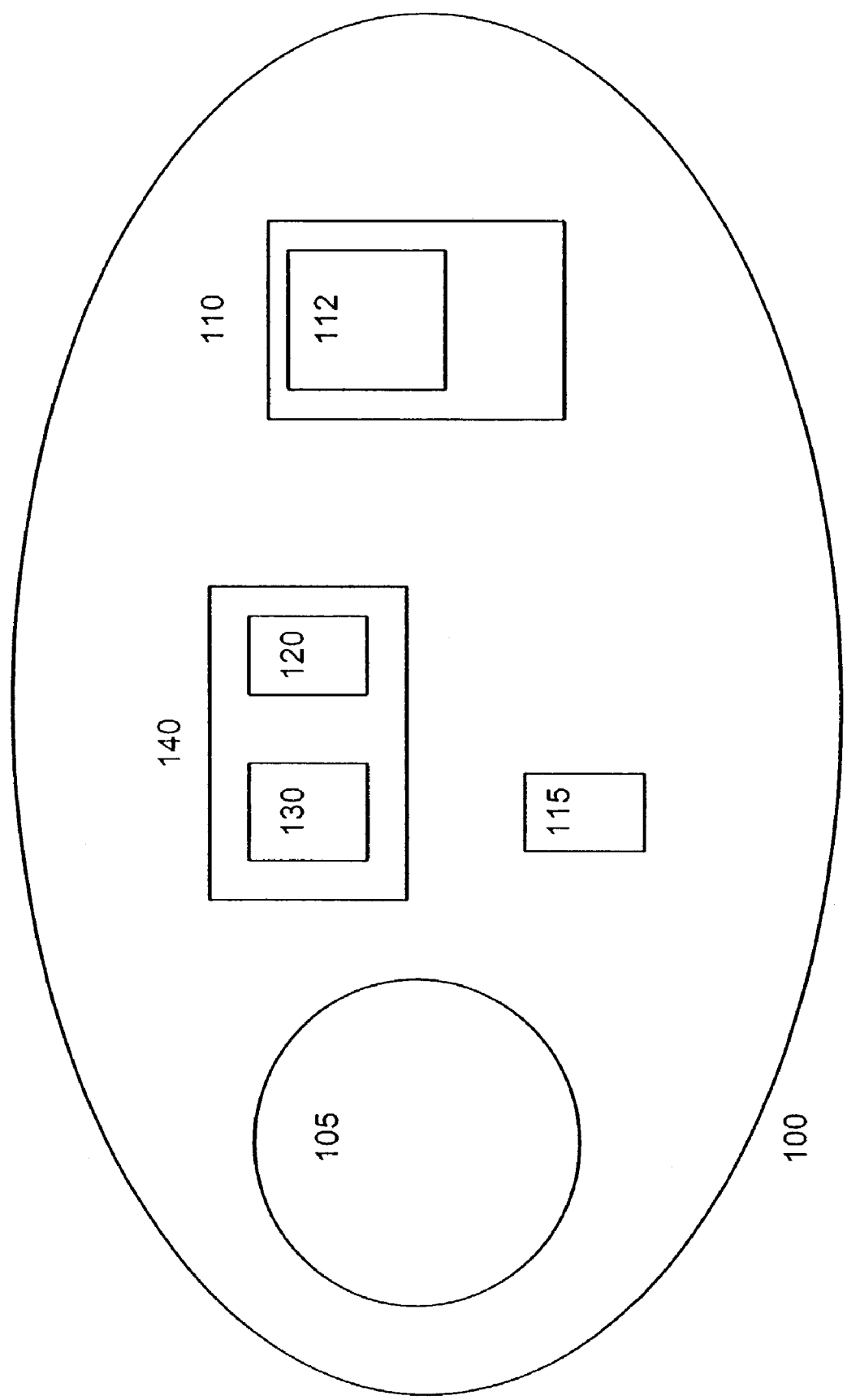
FIG. 1 illustrates a system implementing an embodiment of the Application Download Protocol.

FIG. 1 illustrates a system implementing an embodiment of the ADP. 100 is a communication network. Communication network 100 is adapted to carry information between MT devices and information processing devices connected with a local or wide-area network. The information processing devices may include any type of computer capable of communicating with other devices, data storage devices, and network infrastructure as is well known by one of ordinary skill in the art. In an embodiment, communication network 100 is in communication with other data networks. Examples of other data networks include local or wide-area networks, such as private corporate networks, intranets, and extranets, as well as public networks such as the Internet. In an embodiment, communication network 100 includes wireless data communication facilities for communicating information to MT devices without the use of wires, optical fibers, or other physical connections. In a further embodiment, portions of communication network 100 include physical data communication connections such as wires or optical fibers.

In an embodiment, communication network 100 implements one or more data communication protocols for handling data traffic. An example of a data communication protocol is TCP/IP. In an embodiment, additional higher-level data communication protocols are overlaid on one or more low-level data communication protocols. The high-level data communication protocols provide a level of abstraction for implementing higher-level functionality. In an embodiment, the ADP operates through a MIME-capable transport in order to communicate information over communication network 100. Examples of MIME-capable transports include HTTP 1.1, WSP, and Wireless Profiled HTTP. In a further embodiment, security protocols may used for encrypted communication through a data communication protocol. Examples of security protocols include SSL/TLS for use with the HTTP protocol, and WTLS for use with the WSP protocol. The structure and operation of these data communication protocols in communication network is well known to one of ordinary skill in the art.

Application Download Server (ADS) 105 is in communication with communication network 100. ADS 105 can communicate information to other information devices connected with communication network 100, including MT devices. In an embodiment, ADS 105 is also connected with other information networks for the purpose of exchanging information. Examples of other data networks include local or wide-area networks, such as private corporate networks, intranets, and extranets, as well as public networks such as the Internet.

An embodiment of the ADS is a software application executing on one or more computers. The computers include one or more processing components, data input and output components, and temporary and/or permanent data storage components. These components may be located together or distributed in various locations.

ADS 105 coordinates the application download process. Functions of this process include locating an application for download, configuration of an application for a specific recipient, communicating the application to the recipient, and charging the account of a recipient for the downloaded application. In an embodiment, ADS 105 is controlled by the network operator. In an alternate embodiment, the ADS is controlled by a separate application provider.

Mobile terminal (MT) device 110 is in communication with communication network 100. MT device 110 is in communication with ADS 1105 through communication network 100. MT device 110 may also be in communication with other information devices, including other MT devices, connected with communication network 100 or other information networks connected with communication network 100.

A Download Object (DO) is data adapted to be downloaded and utilized by a Mobile Terminal device. Examples of the types of data contained in a DO include applications, operating system or AEE updates, audio and/or video content, and text. The types of DOs available are limited only by the capabilities of the communication network 100 and the Mobile Terminal device. The ADP is capable of working with any type of DO.

Download Objects 115 and 120 are in communication with communication network 100. DO 120 resides within protected domain 140. Protected domain 140 is a portion of communication network 100 under the exclusive control of the network operator. Access to DO 120 is monitored and controlled by the network operator. In an embodiment, MT devices cannot access DO 120 without authorization by the network operator. In an embodiment, the monitoring and access control of protected domain 140 is handled by the ADS 105.

DO 115 resides outside protected domain 140. In an embodiment, DO 115 resides on a portion of communication network 100 under the control of the network operator. In an alternate embodiment, DO 115 resides on a portion of the communication network 100 under the control of a third party.

MT device 110 includes Application Manager (AM) 112. AM 112 is software residing on MT device 110 for managing the downloading of DOs in conjunction with ADS 105. AM 112 also manages the operation of the DOs stored on MT device 110. In an embodiment, the operations managed by AM 112 include monitoring and recording DO use on MT device 110, and enabling or disabling DO use by MT device 110. In a further embodiment, AM 112 verifies that a DO is compatible with MT device 110 prior to downloading. Verification includes ensuring there is sufficient storage on MT device 110 for the DO, and there are resources on MT device 110 to properly utilize the DO.

Wireless Application Descriptor (WAD) 130 instructs AM 112 on the download process for a DO. WAD 130 specifies one or more operations to be performed by the AM 112. Examples of operations include installing a DO, updating a DO with a new version, and deleting a DO.

WAD 130 also specifies metadata for DOs. In an embodiment, DO metadata is specified as one or more metadata elements. Types of metadata elements include Package elements, Object elements, Restriction elements, Device elements, and Icon elements. A complete WAD may contain any number of metadata elements of any type. In an embodiment, all of the elements of a WAD are specified in XML format.

Package elements define one or more DOs. The AM 112 performs a specified operations on each DO defined in a package element. In an embodiment, the operation for each defined DO is specified by an associated object element. Operations specified by an object element include installing a DO on MT device 110, updating a DO on MT device 110, and deleting a DO on MT device 110.

In an embodiment, object elements specify metadata attributes for the DO. The following table lists examples of the types of metadata attributes which may be specified by an object element.

TABLE 1

Object Element Metadata Attributes

| Tag | Description |
| --- | --- |
| name | DO name |
| type | MIME type of DO |
| type-version | version of do |
| vendor | author of do |
| copyright | copyright information of DO |
| object-URI | URI for locating DO on a communication network |
| description | description of DO |
| size | size of DO |
| storage | DO storage requirements |
| profile-URI | URI specifying location of requirements for DO |
| can-delete | whether DO is deletable |

TABLE 1-continued

Object Element Metadata Attributes

| Tag | Description |
| --- | --- |
| delete-confirm | prompt user before deleting object |
| status-timeout | specify a specific timeout in seconds for delivery of a status report ranging from 0 to 900 |
| status-URI | URI for posting status of do download |

Several types of object attributes specify Uniform Resource Identifiers (URIs) for locating a DO or other resources on the communication network 100. A URI, also referred to as Uniform Resource Locators (URLs), are short strings that identify network resources: documents, images, downloadable files, services, electronic mailboxes, and other resources. They make resources available under a variety of naming schemes and access methods such as HTTP, FTP, and Internet mail addressable in the same simple way. The use of URIs for accessing network resources is well known among those of ordinary skill in the art.

Restriction elements enable network operators or application vendors to specify business rules for a DO may be used after it is downloaded and installed on MT device 110. In an embodiment, types of restrictions include: none, time, count, function, and date. A value attribute associated with each of the restriction types further specifies the DO behavior.

A restriction element of none allows unlimited, unrestricted use of a downloaded DO. A restriction element of time instructs AM 112 to allow use of a downloaded DO for a limited period of time. With this type of restriction element, the value attribute specifies the amount of time the DO may be used by MT device 110. A restriction element of count instructs AM 112 to allows MT device 110 to use a downloaded DO a limited number of times. The value attribute specifies the number of times a DO may be used by MT device 110. A restriction element of date instructs AM 112 to allow use of a downloaded DO until a specified date. The value attribute specifies a date after which the DO can no longer be used by MT device 110. In an embodiment, the value attribute complies with a standard format for defining date and time. An example of a standard format for date and time is the W3C Date and Time/ISO 8601 standard.

A restriction element of function instructs AM 112 to limit the functionality of a downloaded DO. The value attribute contains one of a plurality of predefined keywords specifying the functionality level of the DO. Examples of keywords include demo, limited, and full. When a functionally-restricted DO is used by MT device 110, the keyword specified by the associated value attribute is passed to the DO. The DO must then decide which features should be available to users.

AM 112 monitors the use of a DO by MT device 110. When the MT device's use of a DO has exceeded the associated usage restriction, for example, by attempting to use a DO after a restricted date, AM 112 instructs the MT device not to use the DO. In an embodiment, MT device 110 informs the user that the DO has expired. In a further embodiment, a restriction element includes an attribute for defining a renewal URI. Upon expiration of a DO, the renewal URI contains a Uniform Resource Locator (URL) for renewing a DO. Since usage restrictions are specified by the WAD 130, rather than the DO, renewal can be accomplished by downloading a new WAD.

Device elements define the minimum resources required for use of a DO. Resources include the minimum required hardware capabilities of a MT device and the minimum requirements for an AEE. In an embodiment, device elements are specified in a separate profile XML document. The location of the profile XML document is specified by a URI in WAD 130.

Icon elements specify an icon for visually representing the DO on the MT device 110. In an embodiment, attributes of icon elements include a URI locating an image for representing a DO, and a MIME-type for defining the image type. A further attribute may be an alternative text string for display if the MT device 110 does not support the icon image type.

WAD 130 instructs AM 112 on the download process for a DO. A WAD must be employed for each operation to be performed by the AM 112. In an embodiment, there is a separate WAD for each DO. In an alternate embodiment, a single WAD specifies a plurality of DOs. This can be done with a package element defining the plurality of DOs handled by the WAD.

The behavior of a DO is altered by changing the restriction elements in the WAD. This allows an application provider or a network operator to quickly implement different business models for a DO without having to modify the DO. A network operator may have several different WADs for a single DO. This permits a network operator to make different business models available to its customers without changes to the underlying DO.

Since the restriction elements of a WAD are crucial to implementing the network operator's business model, in the embodiment shown in FIG. 1, WAD 130 is located in protected domain 140. This insures that only the network operator is able to configure usage restrictions for a DO. In a further embodiment, AM 112 may be restricted to only retrieving a WAD from locations within protected domain 140. In addition to preventing circumvention of a network operator's business model, this restriction facilitates billing customers for DO use. Since each WAD access by a MT device corresponds to a new DO installation, the network operator can easily identify DO sales by monitoring MT device access to WADs within protected domain 140.

Figure 2:
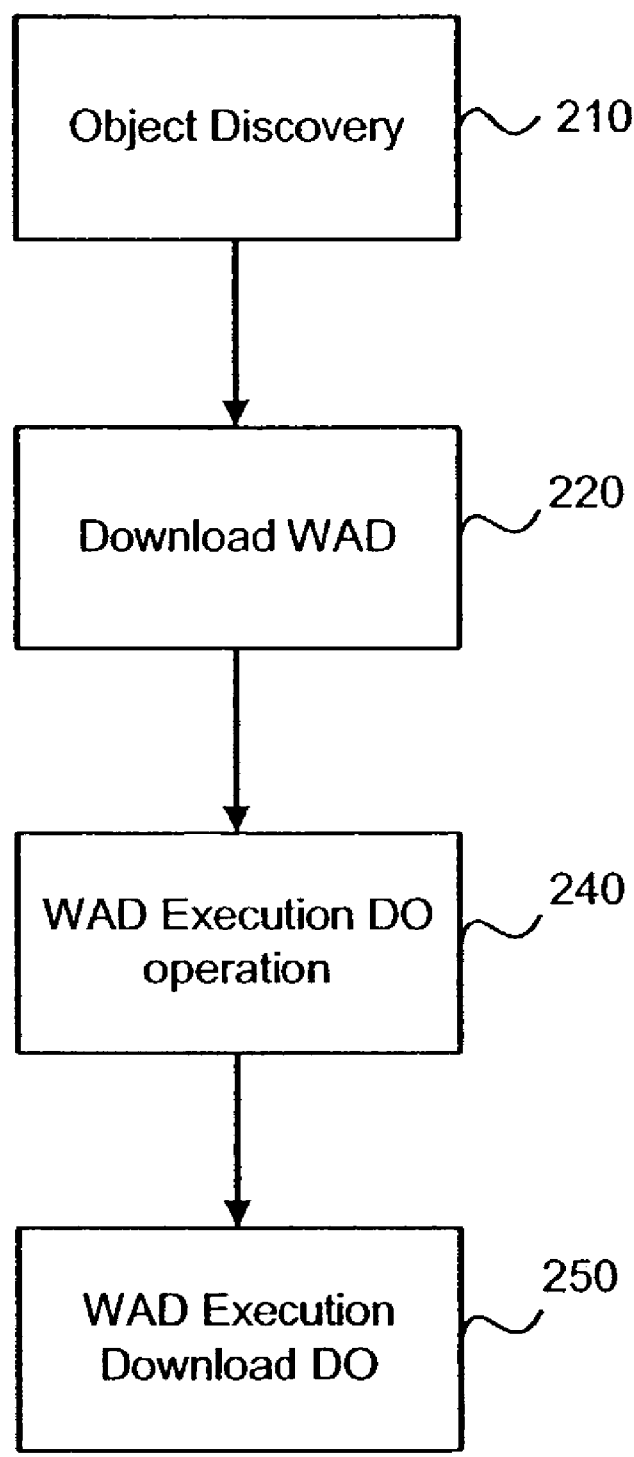
FIG. 2 illustrates a flowchart of the operation of an embodiment of the Application Download Protocol.

The flowchart of FIG. 2 illustrates the operation of an embodiment of the ADP. Object discovery 210 is the first step of ADP operation. Object discovery is the process of selecting a DO and associated operation from an ADS for downloading to a MT device. Object discovery may be user-initiated, enabling users to manually select an object and operation for a device, or network initiated, enabling network operators to send DOs and associated operations to MT devices.

In user-initiated object discovery, a user selects a DO for download through a Download Application (DA). A DA is a MT device application for retrieving a list of available DO for download. In an embodiment, the DA retrieves the list from the ADS. This process is described in more detail at another point of this application.

The list provided by the DA displays information about the DO and provides a link with a URI to initiate the DO download. The URI specifies the location of a WAD associated with the DO. Once a link is selected, the DA passes the WAD URI to the AM for processing.

In network-initiated object discovery, the MT device receives a network download request via a network initiation protocol. Examples of network initiation protocols include the WAP Push protocol and SMS Push protocol. For WAP Push, the MT device receives a URI to a WAD via a WAP Push SL request via WAP PAP protocol. For SMS Push, the MT device receives a URI to a WAD via a SMS message.

After receiving the network download request, the DA, in an embodiment, alerts the user about potential side effects of receiving the DO requests user confirmation before proceeding with the DO operation. After confirming a DO operation, the DA passes the WAD URI to the AM for processing.

In an embodiment, capability matching is performed during object discovery 210. Capability matching allows the DA to only access DO compatible with the MT device. Capability matching may be performed as discussed elsewhere in this application, or in an alternate embodiment, through the WAP User Agent Profiles mechanism. Application descriptors defining capabilities may reference to a WAP Capabilities and Preference Information (CPI) document that defines the capabilities profile for the DO. The ADS may further match the CPI document of a DO with a CPI document defining capabilities of the MT device.

After it has received the WAD URI, the AM initiates WAD Downloads 220 in order to retrieve the WAD for further processing. In an embodiment, the WAD is downloaded from the protected domain 140. After the WAD has been received, the AM begins WAD Execution—DO Operation 240. In this step, the AM executes all of the DO operations specified in the WAD. Examples of DO operations include installation, upgrading, and deletion. These operations are performed in accordance with the AEE of the MT device.

If an operation requires it, the AM begins WAD Execution—DO Download 250. In this step, the AM identifies the DO specified in the WAD for the current operation. Each DO specified by the WAD includes a URI specifying the location of the DO. The AM retrieves the DO using this URI. In an embodiment, the DO is downloaded from the protected domain 140. In an alternate embodiment, the DO is downloaded from a region outside protected domain 140.

Additionally, the AM initializes resources for any usage restrictions specified in the WAD. The resources for usage restrictions including monitoring resources for monitoring DO usage, and if necessary, storage resources for storing accumulated DO usage values.

In an embodiment, the WAD specifies a plurality of DO for download to the MT device. In order to minimize use of MT device resources, an embodiment of AM performs steps 240 and 250 in sequence for each of DO before processing another DO.

Web Standards-Based Application Execution Environment and Application Packager

The invention addresses the shortcomings of other AEEs by offering developers a way to develop MT application using industry-standard technologies commonly used for web page development. In an embodiment, developers build MT applications using Extensible Markup Language (XML), Extensible Hypertext Markup Language (XHTML), ECMAScript, and Document Object Model (DOM). XHTML is a reformulation of HTML 4 as an XML application. ECMAScript is a scripting language based on Netscape's JavaScript and Microsoft's JScript technologies. DOM is a platform- and language-neutral interface that will allow programs and scripts to dynamically access and update the content, structure and style of documents. By allowing developers to build applications using standard web technologies, rather than specialized AEEs, a large pool of web developers are able to rapidly transition from creating web applications to developing MT applications.

In this embodiment, developers define user interface elements using XHTML. In this way, developers can graphically build their user interface in the same manner as creating a web page. ECMAScript, a descendent of the JavaScript language, is used to provide the application logic. The ECMAScript code manipulates the XHTML user interface through DOM, which provides an object-oriented representation of the XHTML layout. XML is used to store and manipulate data.

In an embodiment, the Web Standards-Based Application Execution Environment (WSAEE), can be implemented in MT devices on top of existing AEEs, such as BREW. This allows the WSAEE to be deployed on virtually any MT device.

Additionally, the invention includes an application packager for automatically tailoring applications to the numerous variations between MT devices. In an embodiment, Cascading Style Sheets (CSS) are used to define application parameters for MT devices. Each CSS defines a set of application parameters, such as screen size, colors, and interface buttons, for tailoring XHTML elements to a specific MT device. The packager takes a single application including an XHTML file defining a standard representation of the user interface and combines it with a CSS for each target MT device. From these resources, the packager outputs separate applications tailored to the unique variations of each MT device. Thus, a developer only needs to build a single version of an application and supply a separate CSS for each target MT device. The packager then automatically creates separate versions of the application for each target MT device.

The WSAEE offers other advantages over prior AEEs in many other respects. For J2ME, the system requirements for MT devices are quite large. Additionally, although very powerful, J2ME is much more complicated and has a much smaller developer base than ECMAScript.

WAP applications use WML and WMLScript. Neither of these technologies are a widespread or as powerful as XHTML and ECMAScript. Unlike WAP applications, WSAEE applications are designed to be executed entirely on the MT device. This improves application performance and allows applications to function offline and in areas without network coverage. Also, being based on XHTML, WSAEE applications are capable of interfacing with web servers directly, rather than using a proxy.

BREW applications are written in a low level language such as C. In BREW, there is no counterpart to XHTML for the rapid specification of user interfaces. Rather than graphically create a user interface, BREW developers must manually code the user interface. Also, BREW is limited to MT devices using Code Division Multiple Access (CDMA) wireless technology. The present invention is adaptable to any MT device regardless of the communication technology employed.

Figure 3:
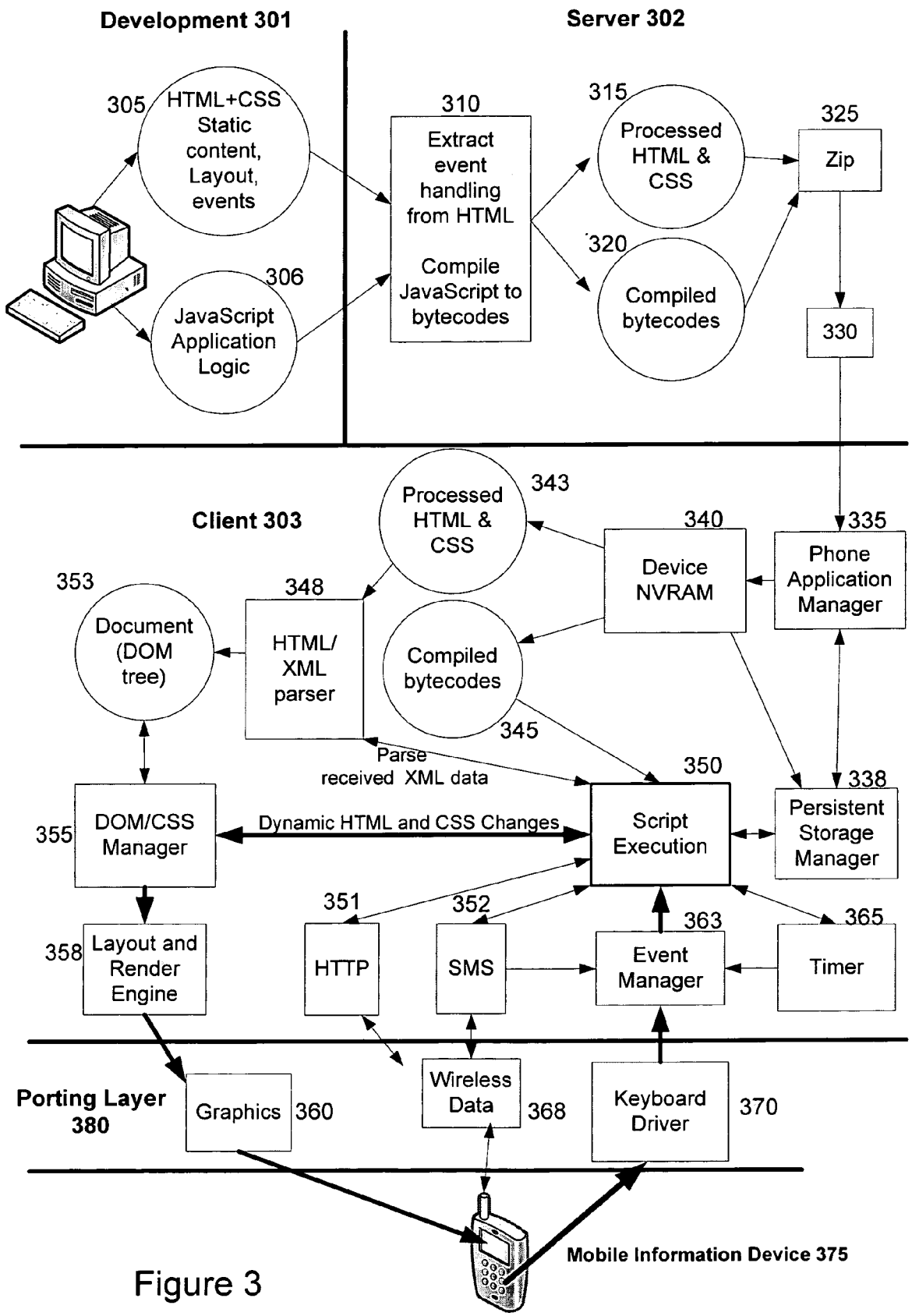
FIG. 3 illustrates the architecture of an embodiment of a Web Based Standards Application Execution Environment.

FIG. 3 illustrates the architecture of an embodiment of a WSAEE. The architecture can be divided into three phases: Development 301, Server 302, and Client 303. Development 301 is performed by the application developer. As discussed above, the developer graphically defines the user interface using XHTML 305. The application logic is added using ECMAScript 306. During development, the ECMAScript Code is embedded in the XHTML file. If the user interface needs to be dynamically updated, the ECMAScript code manipulates the XHTML using DOM. XML is used to store and manipulate data.

In an embodiment, an application is comprised of a single XHTML file. If multiple XHTML pages are required, each XHTML page is written as a separate application. Code in a first XHTML page can be used to transfer to a second XHTML page. During this process, the data from the first page is stored and the first application is automatically shut down. The second XHTML application is then started. Upon completion, the second XHTML page is shutdown, and the first XHTML page is restarted. A restart event is generated by the WSAEE to inform the first application to load the previously stored data. From the user's perspective, the multiple pages appear to part of the same 'virtual' application. This has the advantage of allowing developers to write a 'virtual' application larger than the working memory of the MT device by dividing it into separate applications small enough to be run separately.

After completing development 301, the developer sends the completed XHTML file to the Server phase 302. In addition to the application XHTML file, the developer also sends CSS files for defining application parameters for each of the target MT devices. The CSS definitions may be created by the developer, or derived from a template provided by a MT device or server provider.

In the Server phase 302, a packager prepares the XHTML application for use on one or more MT devices. First, in 310, the packager extracts ECMAScript code from the XHTML file and from any script files referenced by the XHTML file. The script code may be classified by the packager as either top-level code or event-handler code. Top-level code is typically contained within a <script> tag in the XHTML file or within a separate script file. Top-level code typically contains script code associated with the XHTML file as a whole. Examples of top-level code include global function definitions, which are referenced by name from other portions of the script code, and code automatically executed when the application starts and is not otherwise referenced, such as application initialization code. Event-handler code is typically represented as a "code fragment" contained in an attribute value string associated with an XHTML element. The event-handler code specifies the action to be performed when an event associated with the XHTML element occurs. An XHTML file may contain many code fragments of event-handler code.

The packager keeps the extracted top-level code in the same order as it appears in the original XHTML file or script file in order to preserve the specified execution order. Event-handler code is extracted separately from the top-level code. The packager keeps the extracted event-handler code in order, and assigns a unique sequence number to each fragment of event-handler code. The packager embeds a special XML tag in place of each removed code fragment of event-handler code. The XML tag includes a string containing the unique sequence number associated with the removed code fragment. This XML tag is used to locate the appropriate code fragment during the execution of the application.

The following example shows the contents of an XHTML file with both top-level and event-handler code in the original embedded form.

```
<html>
<head>
<title>Title for Test</test>
</head>
<script src= "Test.js"/>
<body onLoad= "initialize( )">
Test
</body>
</html>
```

In this example, top-level code is contained in the separate script file "Test.js", and is referenced in the example file within the "<script>" tag. Event-handler code is referenced in this example as an attribute in the "<body>" tag. In this example, the "onLoad" event will trigger the execution of the function "initialize( )". After the packager has removed the embedded ECMAScript code and script references from the example XHTML file, the contents of the XHTML file will appear as follows.

```
<html>
<head>
<title>Title for Test</test>
</head>
<body onLoad= "^^^^^ 13107">
Test
</body>
</html>
```

The removed application code is then compiled into bytecodes. The process of compiling ECMAScript into bytecodes is similar to that done by the open-source Mozilla JS compiler. However, the Mozilla JS compiler produced a format more suitable for in-memory representation of code, rather than a downloadable form. For 310, the compiler extracts data from a constant table which would normally be stored in memory. The constant table data is appended and linked to the compiled bytecodes. Additionally, references to Mozilla-specific memory structures are removed. If necessary, changes to the compiled bytecodes are made to reflect the byte sex, for example big endian or little endian, of the target MT device.

The stripped XHTML is then processed with the appropriate CSS parameters. If there are multiple target devices with different CSS parameters, then the stripped XHTML is processed separately for each set of CSS parameters. Each resulting XHTML file contains only the elements required for the specified target MT device. This maximizes the use of often limited MT device memory and reduces download time.

From 310, the result is two separate data groups, a processed XHTML/CSS group 315 and a compiled bytecode group 320. The two data groups are then combined into a single file at 325. In an embodiment, compression is also done at 325. One method of compression is through the Zlib library. The resulting combined data file is stored on server storage 330. If there are multiple target MT devices, then the combining is done separately for each processed XHTML group so that separate files are created and stored for each target MT device.

The application is downloaded and executed by a MT device in Client phase 303. Application Manager 335 handles the retrieval and installation of application files from storage 330. Application Manager also initiates and terminates running applications. If an application is suspended or resumed, the application manages instructs the application to save or restore data as needed.

Persistent Storage Manager 338 provides an interface between an application or the Application Manager 335 and Persistent Storage 340. Application Manager 335 instructs the Persistent Storage Manager 338 to store the downloaded application in Persistent Storage 340. In an embodiment, the Application Manager 335 decompresses the application file prior to storage. Persistent Storage Manager creates a directory for the downloaded application in Persistent Storage 340. Persistent Storage Manager 338 uses the directory hierarchy to enforce security between applications. Applications can only reference information in their directory or a subdirectory. There is no up-level directory access. This prevents an application from altering another applications data.

When an application is executed, the processed XHTML is removed from Persistent Storage 340 at 343. At the same time, the compiled bytecodes are removed from Persistent Storage at 345. The compiled bytecodes 345 are sent to the Script Executor 350. Script Executor 350 performs application logic of the application by executing the instructions in the compiled bytecodes 345.

The processed XHTML 343 is processed by XHTML/XML parser 348 to build the document (DOM) tree 353. DOM tree is representation of the XHTML as hierarchical tree structure. Each XHTML element is converted to a node of the DOM tree. Each node is a data object containing the properties of the corresponding XHTML element.

The DOM tree is constructed recursively by the XHTML/XML parser 348. A top, or root, node is created for the XHTML page. Each XHTML element generates a corresponding subnode to the root node. If there are nested XHTML elements, the nodes are connected as subnodes to their parent node. The process is repeated for each level of nesting in the XHTML file until all the elements are processed.

The XHTML/XML Parser 348 has two other functions in addition to creating DOM tree 353. First, application data is stored and retrieved from Persistent Storage 340 as XML data. Thus, data from the Script Executor 350 is sent to the XHTML/XML Parser 348 for conversion to XML prior to storage. Following retrieval from Persistent Storage 340, the XHTML/XML Parser 348 converts XML data into raw data for use by the Script Executor 350. Similarly, applications may exchange data with other servers or MT devices in XML format. The XHTML/XML Parser 348 handles the conversion process.

The DOM/CSS Manager 355 manipulates the DOM tree 353. This manipulation includes altering properties of one or more nodes, adding or deleting nodes, updating CSS parameters, and moving nodes or sub-trees of nodes. The DOM/CSS Manager 355 exchanges information with and receives instructions from the Script Executor 350. This enables the application logic to dynamically manipulate the XHTML interface.

Layout and Render Engine 358 also receives information from DOM/CSS Manager 355. Layout and Render Engine 358 creates a graphical representation 360 of the XHTML page from the DOM tree 353. Graphical representation 360 is displayed on the screen of MT device 375.

Script Executor 350 sends and receives data from a variety of sources. The application may communicate with other servers or MT devices via HTTP connection 351 or SMS connection 352. Data through these connections passes through Wireless Data connection 368. Wireless Data connection 368 implements the low level communication protocol required for sending and receiving data over a wireless network. Wireless Data connection 368 provides the interface between the network hardware of MT device 375 and the high level HTTP 351 and SMS 352 protocols.

Keyboard information is input via the keys of the MT device 375. This input is processed by Keyboard Driver 370, which provides a low level interface between the keyboard hardware and the high level Event Manager 363.

Timer 365 can be set by Script Executor 350 to generate timer events after a specific amount of elapsed time. This is used for applications which require accurate timing.

Event manager 363 is used to process system events. Systems events include receiving an SMS message, receiving a timer event, and receiving keyboard input. Event Manager 363 notifies Script Executor 350 when an event has been received and provides information about the event for further processing.

Porting Layer 380 is the low-level interface between the hardware components of MT device 375 and higher level functionality implemented by the Client phase 303. In adapting the Client 303 to different types of MT devices, the most substantial changes are going to be in the components of the Porting Layer 380.

Figure 4:
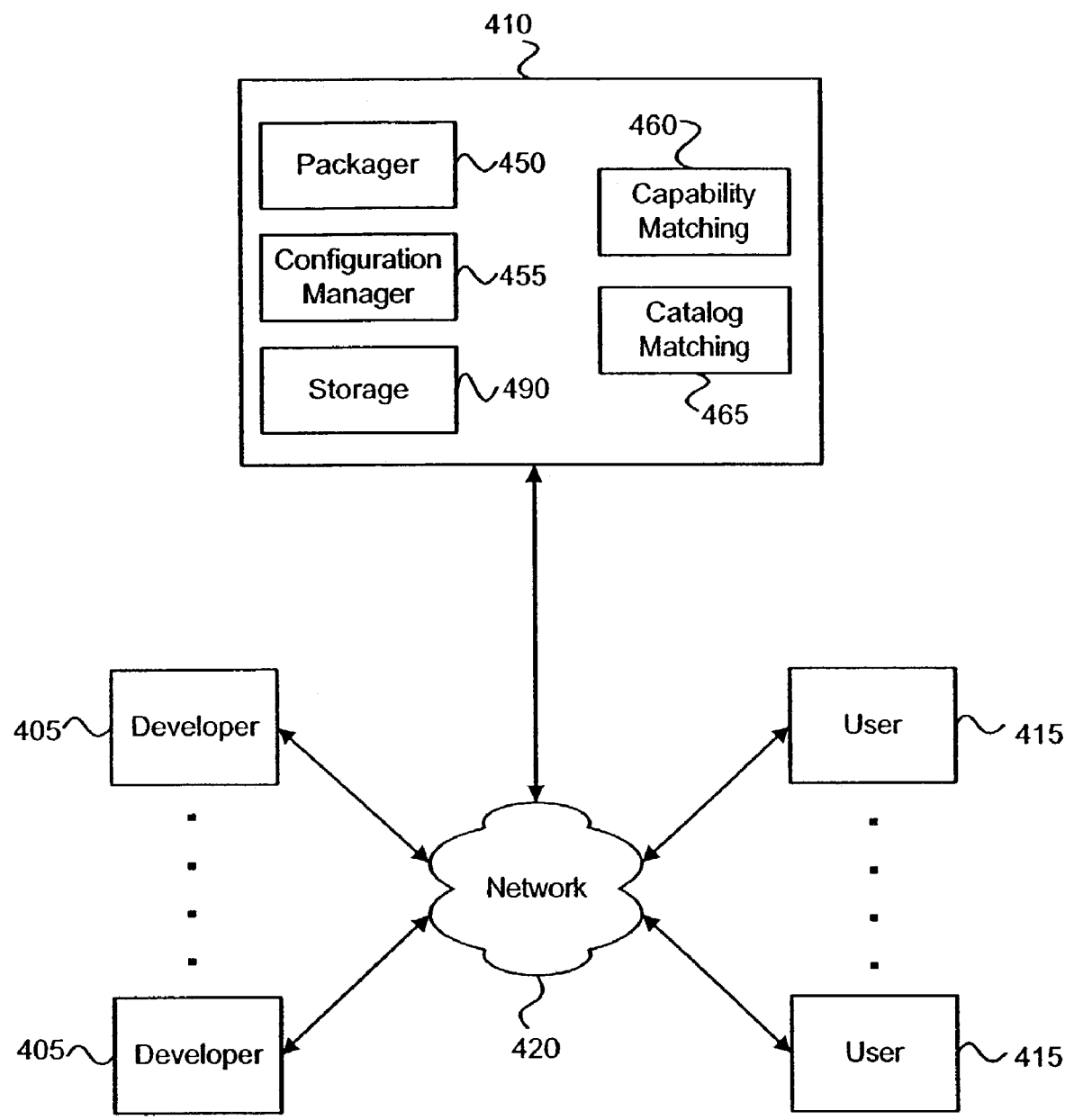
FIG. 4 is a high level block diagram of a networked computer system in accordance with the present invention.

FIG. 4 is a high level block diagram of a networked computer system in accordance with the present invention. In one embodiment, the system of FIG. 3 can be represented by the high level diagram of FIG. 4. Server 410 is in communication with developers 405 and users 415 through network 420. In one embodiment, a web interface is used by developers 405 and users 415 for communication with other elements of FIG. 4, however other interfaces known in the art may also be employed. Server 410 comprises packager component 450, configuration manager component 455, capability matching component 460, catalog matching component 465, and storage component 490, as further described herein. Server 410 can be maintained by a content provider. In one embodiment, server 410 is a Mobile Download Server available from Pixo, Inc., of San Jose, Calif.

Content can be submitted to server 410 by developers 405 through communication over network 420. In one embodiment, this content comprises application software and related files. Submitted content can be processed by the various components of server 410 and downloaded by users 415 for execution, as further described herein. In one embodiment, users 415 are mobile devices in wireless communication with server 410. However, it will be understood by those skilled in the art that any of developers 405 and/or users 415 can be desktop computers, mobile devices, or other computing devices known in the art.

Figure 5:
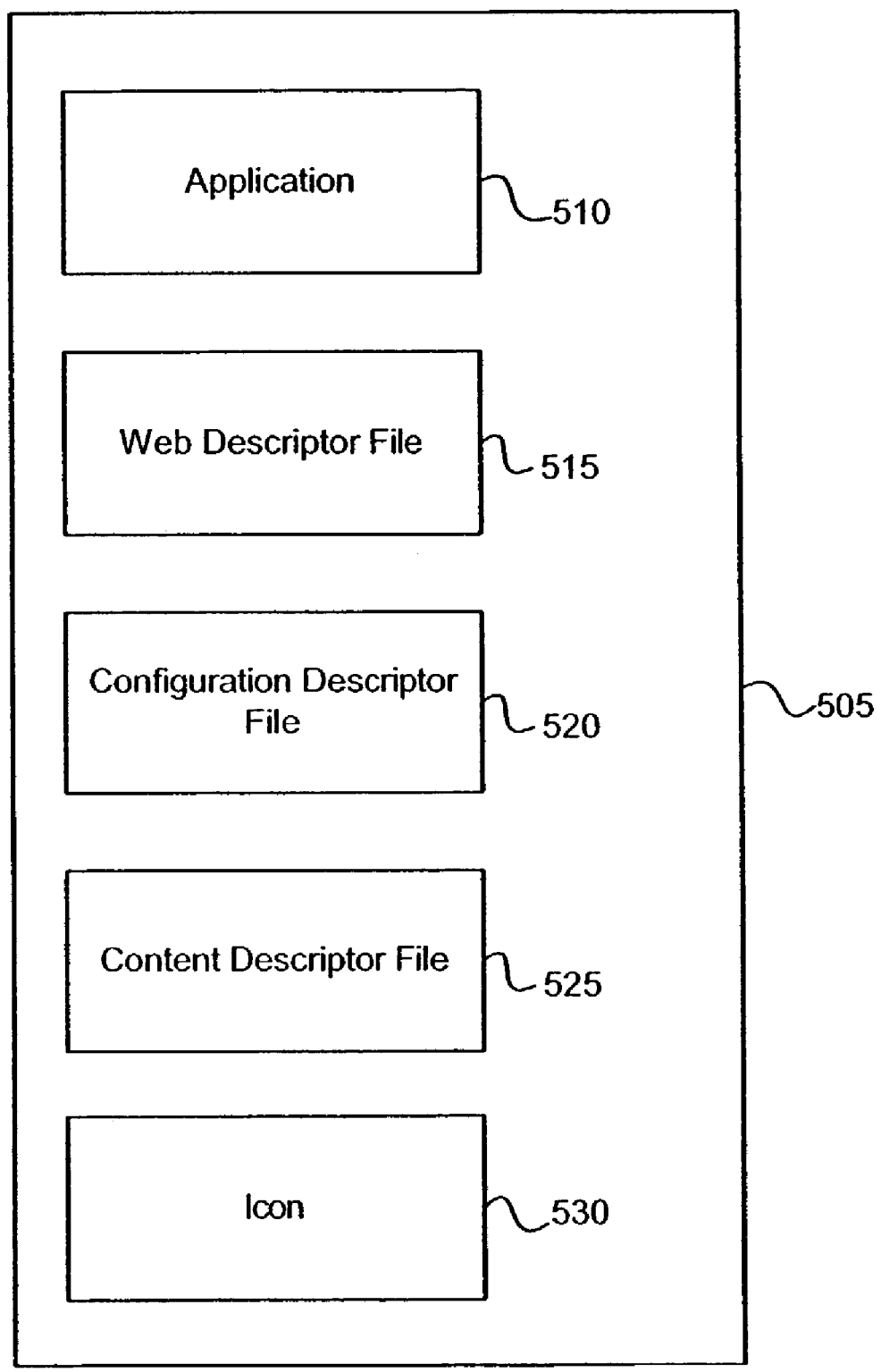
FIG. 5 is a block diagram of a content submission by a developer.

FIG. 5 provides a block diagram illustrating the components of a content submission by a developer 405 to server 410 in an embodiment of the present invention. A container file 505, such as a "zip" file, comprises application 510, web descriptor file 515, configuration descriptor file 520, content descriptor file 525, and icon 530. In one embodiment, application 510 is code for an application to be processed by packager 450 and executed by a mobile device, as further described herein. It will be understood that this code can be encoded in HTML, XML, and/or other means known in the art. Web descriptor file 515 comprises application keywords describing application 510. The keywords can be processed by catalog matching component 465 in accordance with the present invention as further described herein. Configuration descriptor file 520 specifies application data to be managed by configuration manager 455. In another embodiment, file 520 also specifies user interface information relating to the application data. Content descriptor file 525 specifies functionality required by application 510. In one embodiment, capability matching component 460 matches the application 510 to mobile devices based on this functionality. Icon 530 is an icon that can be displayed on a GUI of a mobile device to represent application 510 to the user. In an embodiment, icon 530 is referenced by content descriptor file 525, as further described herein.

Capability Matching

In accordance with a capability matching system of the present invention, applications submitted by developers can be matched to various types of compatible computing devices employed by users. Functionality required by an application can be compared with functionality of computing devices that are known by a content provider. Computing devices that support the functionality required by the application can be matched with the application. Thus, users of mobile devices can be assured that an application matched with their device in accordance with the present invention will properly function when run on the user's device. Likewise, users of incompatible devices can avoid downloading applications that may not operate properly.

Figure 6:
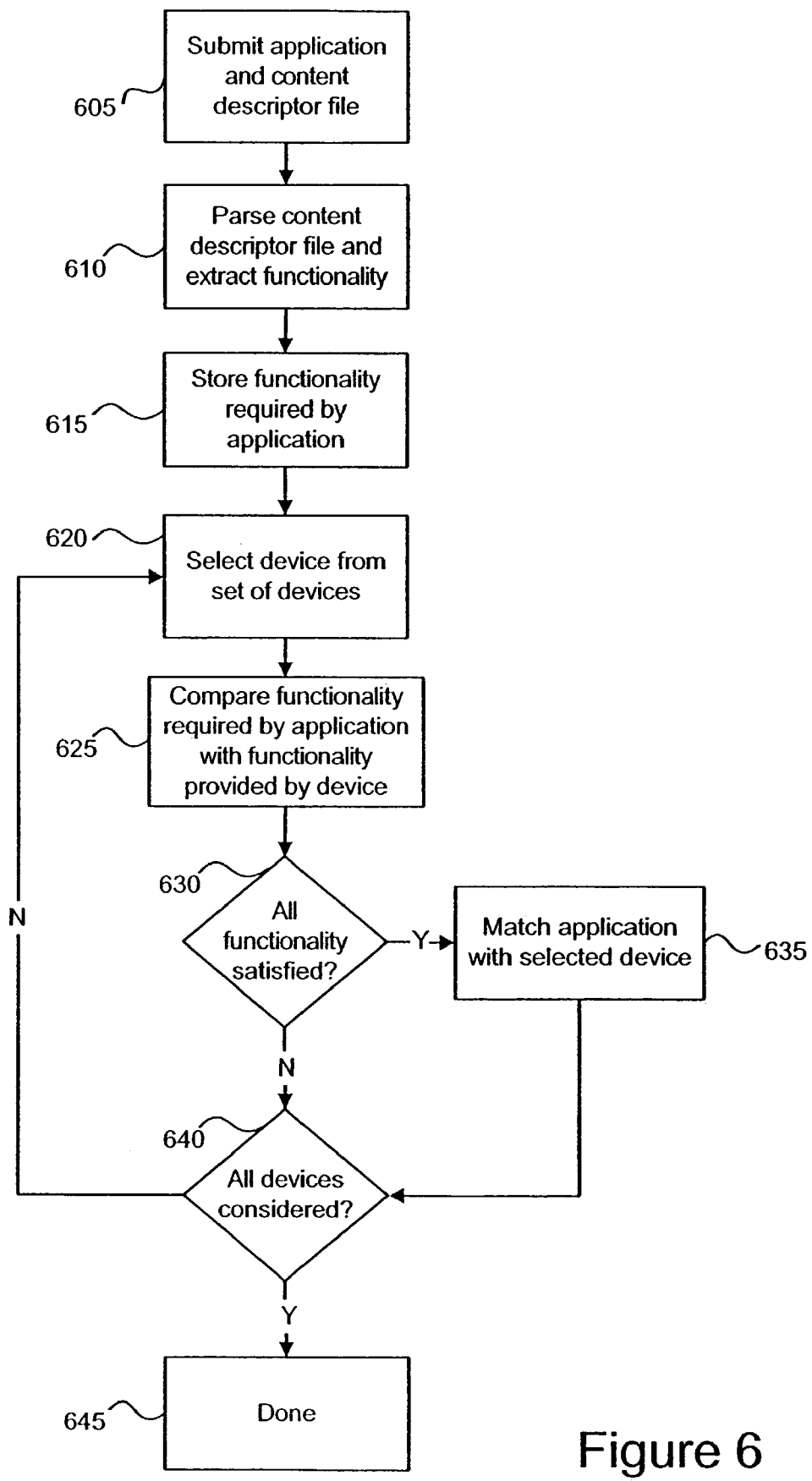
FIG. 6 is a flow chart of a method for submitting an application.

FIG. 6 is a flow chart of a method for submitting an application in accordance with the present invention. In step 605, a developer submits an application and a content descriptor file to a content provider. In one embodiment, steps 610 through 645 of FIG. 6 are performed by capability matching component 460 of server 410. The content descriptor file submitted in step 605 describes the functionality which must be present in a user's device for the application to run properly. This functionality can include a minimum color depth, screen size, memory capacity, or other types of functionality known in the art. In one embodiment, the content descriptor file is an XML file.

In step 605, the content descriptor file is parsed and the description of functionality required by the submitted application is extracted. In step 615, the extracted functionality is stored. In one embodiment, the functionality description is stored in storage component 490. In step 620, a first device type from a set of possible devices which may be used by users 415 is selected. In one embodiment, server 410 maintains a device functionality database in storage component 490. This database identifies the functionality of various types of mobile devices which are known to the content provider, or have been provisioned as further described herein (see FIG. 8). In step 625, the application functionality determined in step 610 is compared with the functionality provided by the device selected in step 620. If all functionality required by the application is satisfied in the selected device (step 630), the application is matched with the selected device in step 635. Otherwise, the method proceeds to step 640. If additional devices remain to be considered (step 640), then the method loops back to step 620 where another device type is selected. If all device types in the database of devices have been considered, then the method is done (step 645).

The content descriptor file can include information that describes the format and encoding of the file, type and identification of the application, icon to be displayed for the application, and other relevant information. The content descriptor file can also provide a list of target attributes to be satisfied in order for the application to run as expected by the developer. These attributes can include carrier, locale, and specific capabilities which must be provided by a user's mobile device. In one embodiment, the content descriptor file is an XML file wherein the information and attributes are provided using tags.

FIG. 7 provides a sample content descriptor file. In one embodiment, the content descriptor file submitted in step 605 conforms to the schema set forth in FIG. 7. Nevertheless, it will be understood that other file formats are also contemplated by the present invention. Descriptions of the XML tags used in the sample file of FIG. 7 are set forth in the following Table 2:

TABLE 2

Content Descriptor File Tags

| Tag | Description |
| --- | --- |
| content-descriptor | file is a content descriptor file |
| midlet | the type of application, for example: a midlet |
| resource-id | id of the application as recognized by content provider |
| content-url | URL location of the application |
| version | version of the application |
| device-icon | location of icon to be displayed on mobile device screen |
| target | list of attributes used for matching application with selected (target) device |
| carrier | name(s) of carrier(s) that support the application |
| locale | geographic location and language where application is to be used |
| device | list of device functions/capabilities required by the application |
| capability id | identifies a particular device function/capability required by the application |
| capability value | value or range of a function/capability required by the application |

It will be appreciated that different types of device capabilities can be specified by the "capability id" tag, wherein each device capability can have a "capability value." It will also be appreciated that multiple carriers and locales can be specified in the content descriptor file, with unique attributes specified for each.

From the sample content descriptor file of FIG. 7, it is clear that the file is formatted in accordance with XML version 1.0 and encoded using a "utf-8" character set. The application submitted with the file is a midlet, and is identified as "Stockticker_1" by content providers. The application resides at the URL: "http://www.midletcentral.com/store/jar/Stockticker.jar?id=123." The application has a version number "1.0." The icon gif file displayed for the application on a user's mobile device GUI is found at "/icon/device_icon.gif." In one embodiment, the location of icon 530 submitted in container file 505 is identified by the device-icon tag.

The application is supported by carrier "pixo." It is also clear that when the application corresponding to the sample content descriptor file of FIG. 7 is used in the United States, the following functionality must be provided by a user's mobile device: bits per pixel in the range 8 to 16, color display, image capable display, US-ASCII or utf-8 character sets, screen height in the range 64 to 128 bits, screen width in the range 64 to 128 bits, and soft key support. The comments included in the file of FIG. 7 further clarity the file's content and schema.

As described above, content providers can maintain a database that identifies functionality provided by various types of user devices. When new user device types are provisioned, the functionality of each new device can be compared with the functionality required by previously submitted applications. If all functionality required by an application is met in the new device, then the application and device are matched with each other.

Table 3 identifies a set of possible device capabilities (functionality). In one embodiment, the capabilities of Table 3 are mandatory capabilities.

TABLE 3

Device Capabilities

| Capability | Description |
| --- | --- |
| BitsPerPixel | number of bits per pixel provided by the device LCD |
| Carrier | name of the carrier that uses the device |
| ColorCapable | whether the device LCD display supports color |
| CountryCode | country code for the locale |
| ImageCapable | whether the device LCD display supports images |
| InputCharSet | input character set that the device supports, such as UTF8 or Latin |
| LanguageCode | language code for the locale |
| MinimumRamInKB | minimum RAM memory residing on the device (in KB units) |
| OutputCharSet | output character set supported by device |
| PixoRunTime | pixo runtime parameter |
| ScreenHeight | screen height |
| ScreenWidth | screen width |
| SoftKeysCapable | whether device supports soft keys |
| CLDC | version of the Connected Limited Device Configuration (CLDC, Sun J2ME) supported by the device |
| MIDP | version of the Mobile Information Device Profile (MIDP, Sun J2ME) supported by the device |
| BrowserType | type of browser residing on the device, such as HTML, WAP, and CHTML |
| ManagerType | type of the application manager residing on the device, such as Java Application Manager (JAM) |

Figure 8:
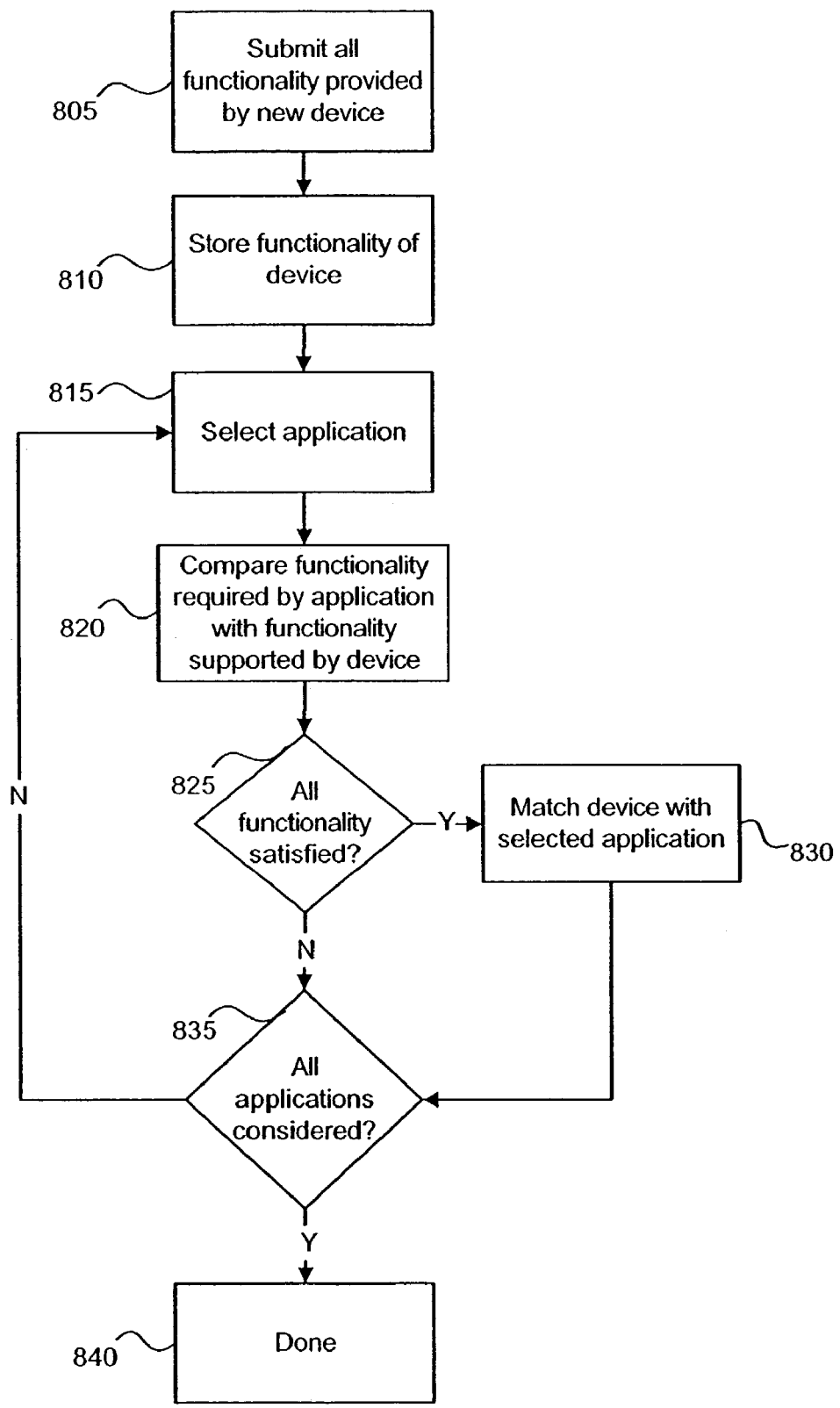
FIG. 8 is a flow chart of a method for provisioning a new device type to a networked computer system.

FIG. 8 is a flowchart of a method for provisioning a new user device type in accordance with the present invention. In one embodiment, steps 810 through 840 of FIG. 8 are performed by capability matching component 460. In step 805, all functionality supported by the new device is submitted. In one embodiment, device capabilities are submitted via a web interface for System Administrators. For example, each device capability can be set via a form submitted in step 805. This functionality is stored (step 810), for example, in storage component 490. In one embodiment, device capabilities are stored on the ADS by running an initialization script during initialization of the ADS. In another embodiment, device capabilities are entered by an administrator through the device management of the ADS. In yet another embodiment, the device capabilities of a device stored on ADS can be changed by an administrator at any time.

A first application is selected (step 815) from the set of previously submitted applications and the functionality required by the application is compared with the functionality of the new device (step 820). In one embodiment, the functionality required by the selected application is determined by the method of FIG. 6. If all functionality required by the application is satisfied by the new device (step 825), then the selected application is matched with the device in step 830. Otherwise, the method continues directly to step 835. If additional applications remain to be considered, the method loops back to step 815 where another application is selected. After all applications have been considered, the method is done (step 840).

Figure 9:
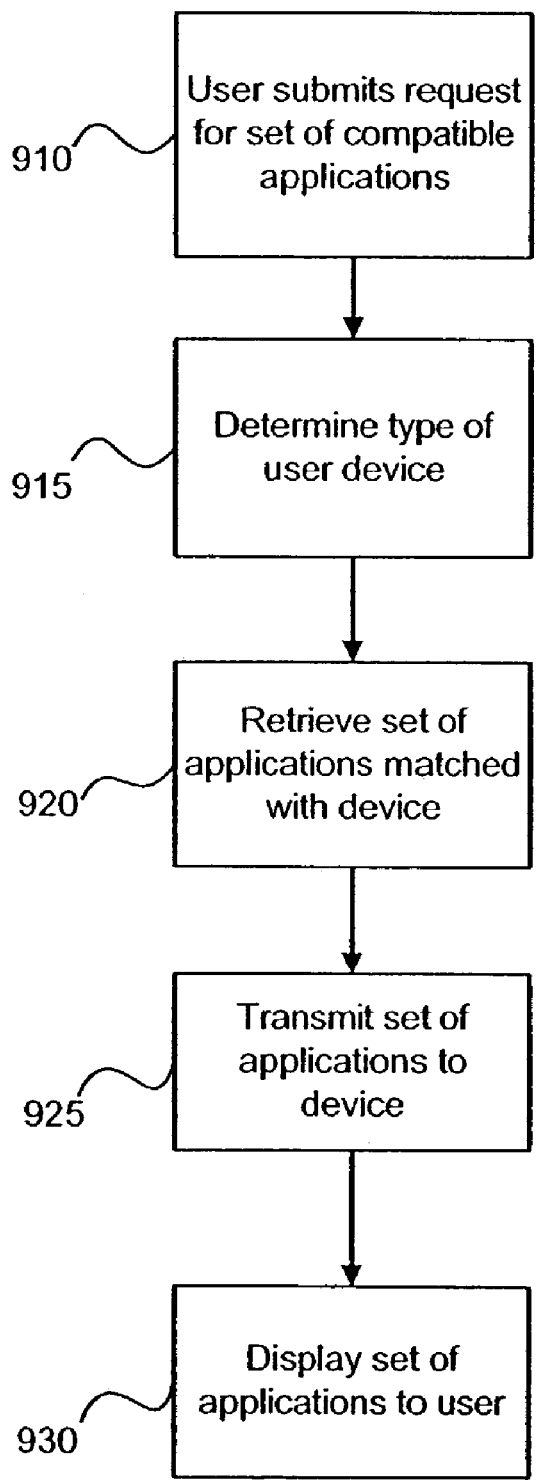
FIG. 9 is a flow chart of a method for displaying compatible applications to a user.

As a result of the methods of FIGS. 6 and 8, every newly submitted application can be properly matched with every previously provisioned device which supports the functionality required by the application. Similarly, every newly provisioned device can be properly matched to every previously submitted application based on the functionality required by the application. Once these matchings have been performed, compatible applications can be displayed to a user. FIG. 9 is a flowchart of a method for displaying compatible applications to a user in accordance with the present invention. In one embodiment, steps 915 through 925 of FIG. 9 are performed by capability matching component 460. Steps 910 and 930 can be performed by a Download Application previously described above. In step 910, a user submits a request to a content provider to display a set of applications compatible with the user's mobile device. In one embodiment, this request is achieved by logging on to a content provider's website. In another embodiment, the request of step 910 refers to a subset of all compatible applications. For example, the request can be restricted to only certain categories of applications, such as all compatible "games" or "calendar" applications.

In step 915, the application provider determines the type of mobile device employed by the user. This determination can be achieved in a variety of ways. In one embodiment, server 410 is integrated with a phone carrier system and can ascertain the user's telephone number, thus determining the type of device registered to the telephone number. In another embodiment, HTTP headers submitted with the request of step 910 which specify the type of device used. In yet another embodiment, headers submitted with the request of step 910 identify functionality provided by the user's device. In another embodiment, the user directly informs server 410 of the device type. In step 920, the content provider retrieves a set of applications matched with the user's device type. In one embodiment, the compatible applications are matched with the user's device in accordance with any of the methods of FIGS. 6 and 8. The set of matched applications are transmitted to the user (step 925) and can be displayed, allowing the user to select one or more applications to download (step 930).

Catalog Matching

In accordance with a catalog matching system of the present invention, application developers can specify application keywords to suggest how a submitted application should be cataloged by content providers. Prior knowledge of a particular catalog hierarchy is not required at the time an application is submitted. In one embodiment, a set of catalog keywords is maintained by a content provider and mapped to categories of an application catalog. Application keywords are compared with the set of catalog keywords. If a match is found, then the application is cataloged according to the categories mapped to the matching catalog keywords. The catalog matching system allows application developers to specify preferred locations for content organization and allows content providers to automatically organize submitted applications into convenient categories at the time of submission. In one embodiment, application keywords are stored in an XML document and hence can be easily updated and customized without modifying application code.

Figure 10:
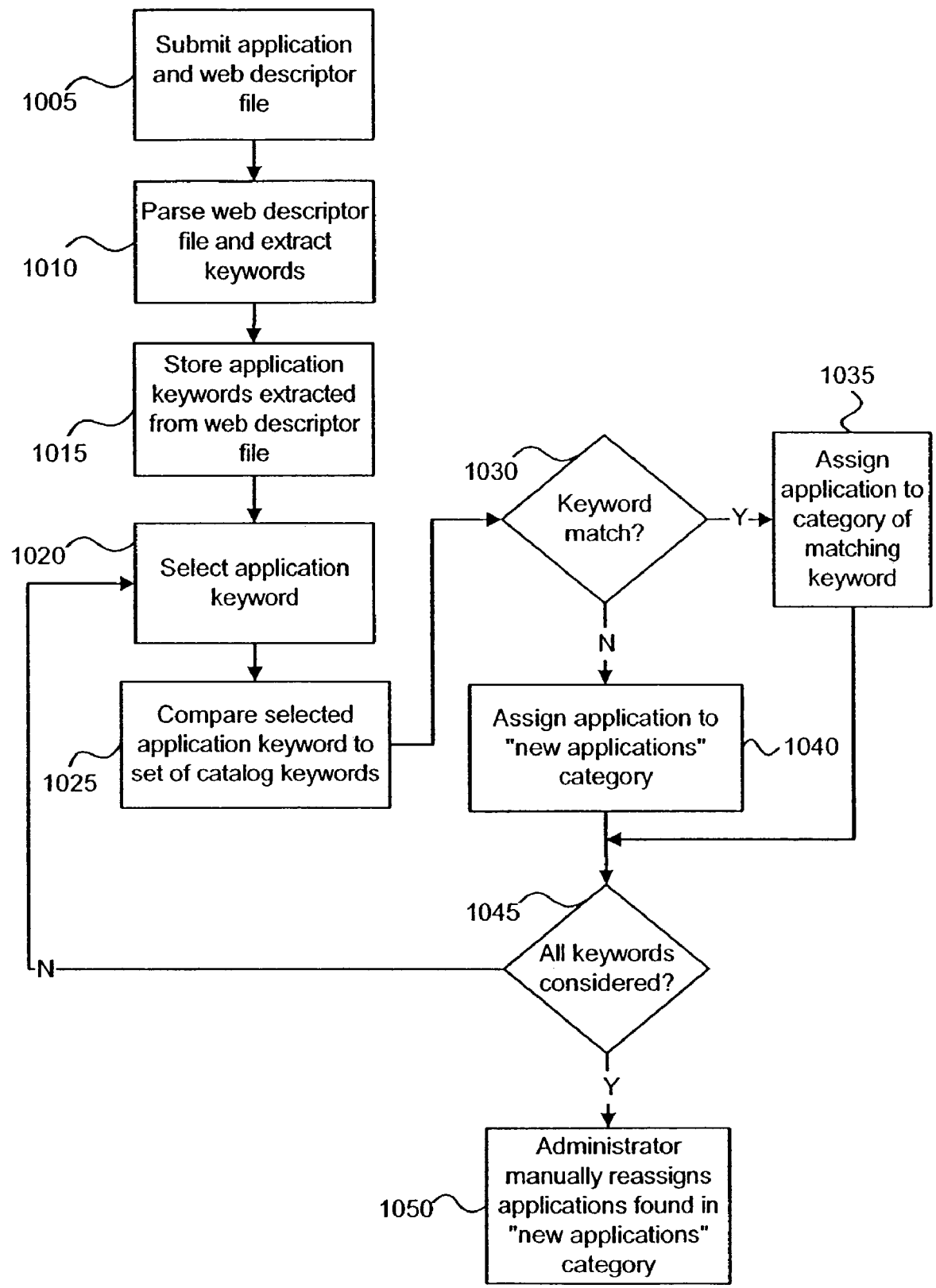
FIG. 10 is a flow chart of a method for automatically cataloging newly submitted applications.

FIG. 10 is a flow chart of a method for automatically cataloging newly submitted applications in accordance with the present invention. In step 1005, a developer submits an application and a web descriptor file to a content provider. In one embodiment, the web descriptor file contains keywords used for cataloging applications in accordance with the method of FIG. 10. In step 1010, the web descriptor file is parsed, and keywords describing the submitted application are extracted. In step 1015, the extracted keywords are stored. In one embodiment, the extracted application keywords are stored in storage component 490 of server 410. In another embodiment, steps 1010 through 1045 are performed by catalog matching component 465 of server 410. In step 1020, a first extracted application keyword is selected, and then compared to a set of catalog keywords (step 1025). In accordance with the present invention, each catalog keyword is associated with at least one category. For example, the catalog keyword: "calendar," may be associated with the category: "utility applications." It will be understood that many different association schemes between catalog keywords and categories are possible. A hierarchy of catalog keywords can also be provided, allowing applications to be assigned to subcategories. In one embodiment, catalog keywords are maintained in a mapping table that maps catalog keywords to categories. In addition, a one-to-one mapping scheme is not necessary. Multiple catalog keywords can map to a single category, and vice versa.

If the selected application keyword matches a catalog keyword (step 1030), the submitted application is assigned to the category mapped to the matching keyword (step 1035). Otherwise, the application is assigned to a "new applications" category in step 1040. If additional application keywords extracted from the web descriptor file remain to be considered (step 1045), the method loops back to step 1020 where the next extracted keyword is selected. If all keywords have been considered, then the method proceeds to step 1050 where an administrator manually reassigns applications found in "new applications" category to categories recognized by the content provider. The amount of manual assignment performed in step 1050 can be minimized by submitting suitably descriptive application keywords in the web descriptor file, and by maintaining a large set of catalog keywords mapped to categories.

FIG. 11 provides a sample web descriptor file. In one embodiment, the web descriptor file submitted in step 1005 conforms to the schema set forth in FIG. 11. Nevertheless, it will be understood that other file formats are also contemplated by the present invention. Descriptions of the XML tags used in the sample file of FIG. 11 are set forth in the following Table 4:

TABLE 4

Web Descriptor File Tags

| Tag | Description |
| --- | --- |
| web-descriptor | identifies file is as a web descriptor file |
| category | keywords used for catalog matching |
| web-group | set of web data pertaining to a particular locale |
| locale | content pertaining to a particular geographic location and language |
| display-name | name of application to be displayed to user |
| short-desc | short description of application |
| long-desc | long description of application |
| small-icon | location of icon for a list on desktop screen |
| large-icon | location of icon for a detail view on desktop screen |

The web descriptor file of FIG. 11 is formatted in XML version 1.0 and encoded using a "utf-8" character set. The file contains keywords: "Home:Business:Finance" that can used by catalog matching component 465 for matching an application with one or more application categories as previously described above.

When the application is used in the United States, the application name is displayed as "StockTicker." The application is described to users as "Get the latest Stock quotes." However, different descriptions can be made available for users of mobile devices ("short-desc") and desktop devices ("long-desc"). An icon to be displayed on a mobile device is located at: "/icon/smallicon.gif."

An icon to be displayed on a desktop device is located at: "/icon/largeicon.gif."

When used in France, the application name is displayed as "Tschüß." The application is described to users as "üß schüßet Tschüß schüß grüßg." As described above, different descriptions can be made available for users of mobile devices and desktop devices. As indicated by FIG. 11, the icons displayed in France are unchanged from those displayed in the United States. However, other icons can be specified. It will be appreciated that additional geographic locations can be specified with unique web descriptor file information for each location. The comments included in the file of FIG. 11 further clarity the file's content and schema.

Remote Management

The present invention further provides a method for remotely managing application data. When submitting a new application, developers can include a configuration descriptor file. This file can specify application data to be managed by a content provider. In one embodiment, strings and/or lists (i.e. a non-linked enumeration of items) are managed. However, it will be understood that other types of application data are also within the scope of the present invention including, but not limited to: calendar entries, contact lists, graphics files, and other data. In one embodiment, application data is managed by configuration manager 455.

The configuration descriptor file can also specify a recommended user interface format for displaying application data to users of particular mobile devices. In such an embodiment, HTML content, and/or other web content, is generated by a content provider for representing the application data in accordance with the user interface format specified in the configuration descriptor file. In one embodiment, a graphical user interface ("GUI") is supported.

After a submitted application has been processed by packager 450, downloaded, and run by a user, application data that is managed by a content provider can be presented to the user in accordance with one or more configurations specified by the developer in a configuration descriptor file. In one embodiment, application data is implemented as name-value pairs. Thus, through the configuration descriptor file, a developer can control the presentation of managed application data as perceived by a users of the application. In one embodiment, configuration descriptor file 520 is an XML file wherein all application data to be managed by a content provider is communicated to and from server 410 in XML format.

The configuration descriptor file can include information that describes the format and encoding of the file, and identify a set of application data to be managed. In one embodiment, for each application data item in the set, the configuration descriptor file can specify various attributes of the application data, including: default values, guard values, value ranges, user interface characteristics, display characteristics, and others. In one embodiment, the configuration descriptor file is an XML file wherein the information and attributes are provided using tags.

FIGS. 12A and 12B illustrate a sample configuration descriptor file in accordance with the present invention. In one embodiment, the configuration descriptor file submitted in step 1310 (see below) conforms to the schema set forth in FIGS. 12A and 12B. Nevertheless, it will be understood that other file formats are also contemplated by the present invention. Descriptions of the XML tags used in the sample file of FIGS. 12A and 12B are set forth in the following Table 5:

TABLE 5

Configuration Descriptor File Tags

| Tag | Description |
| --- | --- |
| phonelet-config | file is a configuration descriptor file for application |
| config-item-list | list of application data to be managed |
| config-item name | name of a particular application data item |
| default-value | default value for application data |
| guard | application data must fall within a set of specified values |
| range | range of permissible values for application data |
| gui | GUI display implementation to be used for application data |
| config-item type | type of application data (i.e. list) |
| option-list | list of items for application data having a "list" type |
| list-item | specific item to display in a list |
| gui type | type of GUI to display (i.e. dropdown list) |
| display-name | name to display near GUI representation of application data |
| display-attrs lines | number of lines to display for application data having a "list" type |
| display-attrs multiple | specifies whether multiple values of displayed application data can be selected by user |

The configuration descriptor file of FIGS. 12A and 12B is formatted in XML version 1.0 and encoded using a "utf-8" character set. A list of application data is provided wherein each application data item has various specified attributes. In this example, "Broker" application data has a default value of "MS." "Speed" has a default value of "15" and must have a value in the range 14 to 20 (inclusive). Speed data is displayed in a user's GUI with the name "Speed." "Agent" data is a list of options comprising the set: "AAAA," "BBBB," "CCCC," and "DDDD," with "AAAA" being the default value. Agent data is displayed in a user's GUI with the name "Agents." "Symbols" data is a list comprising the set: "yahoo," "cisco," "pixo," "ebay," and "intel." It is displayed as a list with the name "Stock Symbols." Up to three items in the list can be selected by a user, with "yahoo," "pixo," and "ebay" being the default selected values. The comments included in the file of FIGS. 12A and 12B further clarify the file's content and schema.

Figure 13:
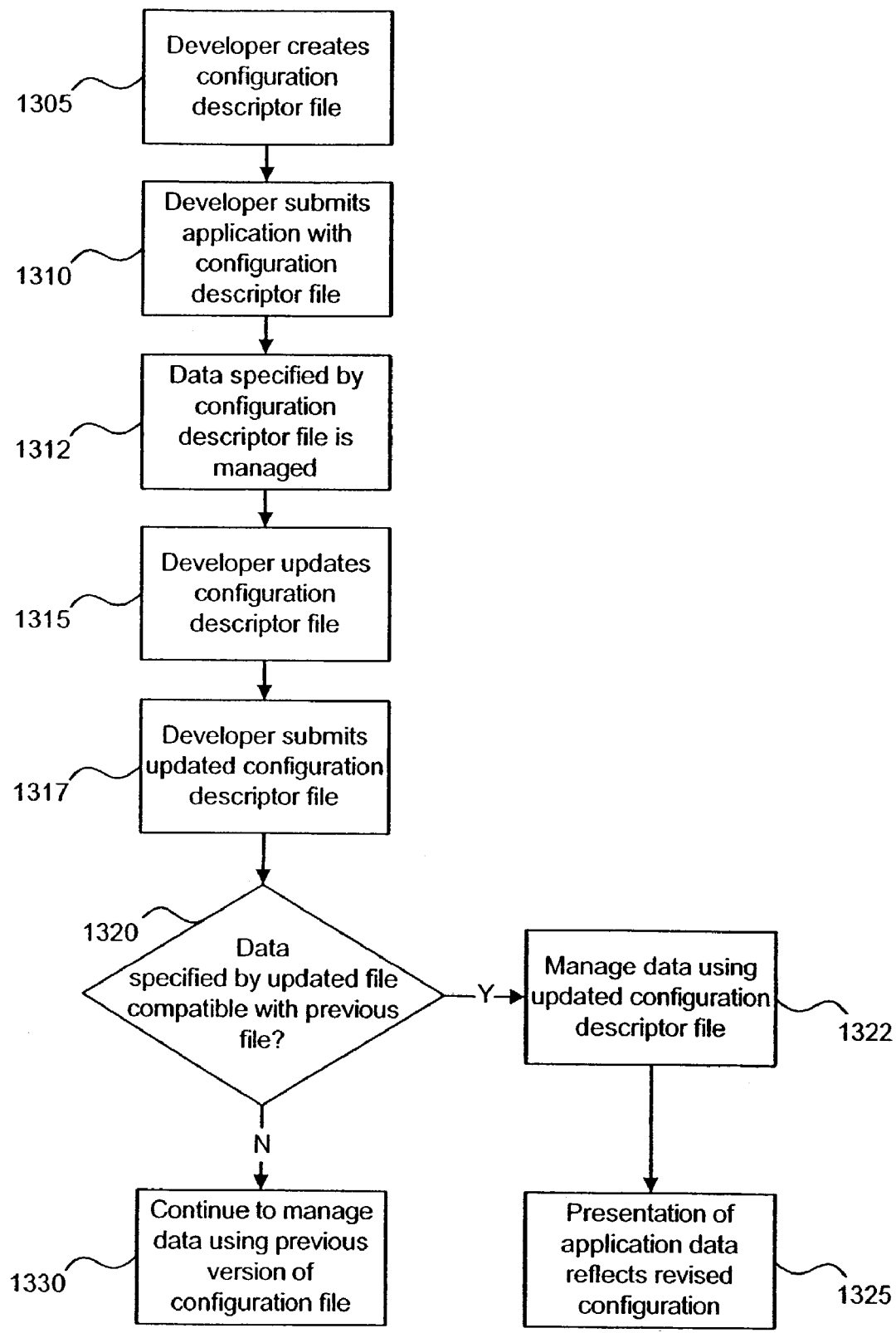
FIG. 13 is a flow chart of a method for remotely managing the configuration of an application.

FIG. 13 is a flow chart of a method for remotely managing the configuration of an application in accordance with the present invention. In step 1305, a developer creates a configuration descriptor file. The configuration descriptor file is submitted with an application to a content provider (step 1310). Data specified by the configuration descriptor file, such as application data, is then managed in accordance with the configuration descriptor file (step 1312). In one embodiment, this management is performed by a content provider that is removed from the application developer. As a result, the application data specified by the configuration descriptor file can be managed remotely without direct supervision or further involvement by the application developer.

At a later time, the developer may choose to revise the way in which managed data is presented in the user interface of the application. Alternatively, the developer may decide to change the type, quantity, or other aspects of the data managed by the content provider server. Accordingly, the developer can update the configuration descriptor file (step 1315) and submit the revised file to a content provider (step 1317). If the data specified by the updated file is compatible with the previous version of the configuration descriptor file (step 1320), the data specified by the updated file is managed (step 1322) and presented (1325) in accordance with the updated file. Otherwise, if the data specified by the updated file is not compatible with the previous version of the file, data continues to be managed in accordance with the previous version of the configuration file (step 1330).

Figure 14:
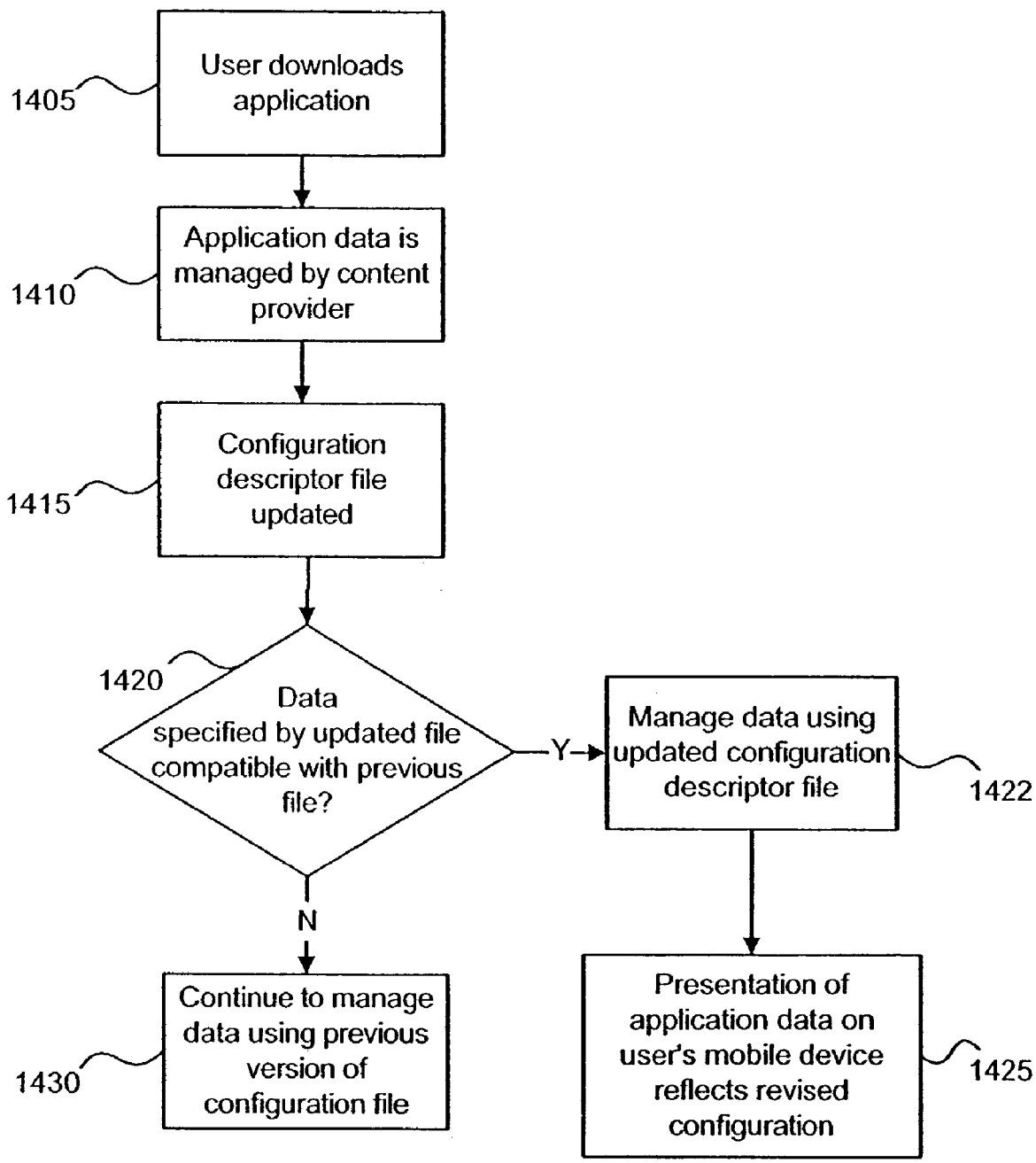
FIG. 14 is a flow chart of a method for receiving application data for a remotely managed application.

FIG. 14 is a flow chart of a method for receiving application data for a remotely managed application in accordance with the present invention. The figure describes the remote management of application data as perceived by a user in one embodiment of the present invention. In step 1405, a user downloads an application from a content provider after the application has been packaged by packager 450. Upon running the application, the application data specified by the corresponding configuration descriptor file is managed by a content provider (step 1410). In one embodiment, the management of application data includes synchronizing the application data between multiple user devices.

The configuration descriptor file may be subsequently updated by the developer (step 1415). If the data specified by the updated file is compatible with the previous version of the configuration descriptor file (step 1420), the data specified by the updated file is managed (step 1422) and presented on the user's mobile device in accordance with the updated file (step 1425). Otherwise, if the data specified by the updated file is not compatible with the previous version of the file, data continues to be managed in accordance with the previous version of the configuration file (step 1430).

The present disclosure, including the specification and accompanying figures, has been presented for purposes of illustration, description, and enablement. It is not intended to limit the invention to the precise form disclosed. Modifications and variations of the invention are possible in view of this disclosure. For example, although the present invention is described herein in relation to particular network configurations and computing devices, it will be understood that the present invention is similarly applicable to alternate configurations and devices. In addition, any of the files described herein can be combined and/or separated into other files without departing from the spirit or scope of the present invention. It is further contemplated that, where feasible, steps set forth in this disclosure can be combined, separated, and/or rearranged. The present invention can be implemented in hardware and/or software. For example, software which implements steps of the invention can reside as information encoded in a computer readable medium including magnetic media, optical media, electrical signals, or other media known in the art.

What is claimed is:

1. A computer implemented method for producing an application to be executed on one or more types of target mobile devices, respective application parameters being defined for each type of target mobile device, the method comprising:
   (a) scanning an application file to identify script code;
   (b) generating a stripped file by,
      (i) extracting each identified script code from the application file, and
      (ii) inserting a unique sequence number in the application file in place of each extracted script code for locating referenced code fragment during the execution of the application; and
   (c) compiling the extracted script code to produce compiled code in the form of bytecodes,
   for each type of target mobile device, processing the stripped file using the respective application parameters to generate a respective processed file containing only elements for that type of target mobile device, and for each type of target mobile device, combining the compiled code and the respective processed file;

wherein the compiled code forms a first data group and the processed file forms a second data group, the first and second data groups being separate groups that are combined into a single file that is configured to be downloaded to and executed on the target mobile device.

2. The method of claim 1, wherein the application file includes user interface elements.

3. The method of claim 1, wherein an application manager is provided on the target mobile device; the method comprising:

receiving download instructions for the application to be downloaded to the target mobile device; and transmitting the application to the target mobile device.

4. The method of claim 3, wherein receiving download instructions includes:

receiving a download instruction for one or more operations to be performed on the application.

5. The method of claim 3, wherein the download instructions include at least one operation to be performed.

6. The method of claim 5, wherein the download instructions include metadata information regarding the application.

7. The method of claim 6, further comprising:

verifying application compatibility with the target mobile device before downloading.

8. The method of claim 7, wherein verifying application compatibility includes:

determining that sufficient storage space for storing the application exists on the target mobile device.

9. The method of claim 8, wherein verifying application compatibility includes:

determining that sufficient resources for application operation exist on the target mobile device.

10. The method of claim 1, further comprising:

selecting the application and associated operation for download to the target mobile device;

receiving an application description, the application description including operations to perform for the application;

executing the operations for the application; and transmitting the application and operation for download to the target mobile device.

11. In a system for producing an application to be executed on one or more types of target mobile devices, respective application parameters being defined for each type of target mobile device, a method for producing the application comprising:

extracting script code from an application file and inserting a unique sequence number in place of each extracted script code for locating referenced script code fragment during the execution of the application;

compiling the extracted script code to produce compiled code in the form of bytecodes;

processing a stripped file using the respective application parameters for each type of target mobile device to generate a respective processed file containing only elements for that type of target mobile device, and for each type of target mobile device, combining the compiled code and the respective processed file wherein the stripped file is created by extracting each identified script code from the application file and the compiled code forms a first data group and the processed file forms a second data group, the first and second data groups being separate groups that are combined into a single file that is configured to be downloaded to and executed on the target mobile device;

sending download instructions including metadata information for the application to be downloaded to a target mobile device; and transmitting the application to the target mobile device.

12. The method of claim 11, wherein the transmitting further comprising:

verifying application compatibility with the target mobile device before downloading.

13. The method of claim 12, wherein verifying application compatibility includes:

determining that sufficient storage space for storing the application exists on the target mobile device.

14. The method of claim 13, wherein verifying application compatibility includes:

determining that sufficient resources for application operation exist on the target mobile device.

* * * * *